(12) United States Patent
Keebler et al.

(10) Patent No.: US 9,536,008 B2
(45) Date of Patent: Jan. 3, 2017

(54) SYSTEM AND METHOD FOR GENERATING DIGITAL CONTENT

(71) Applicant: Scribble Technologies Inc., Toronto (CA)

(72) Inventors: Jonathan Keebler, Toronto (CA); Krzysztof Wiercioch, Mississauga (CA); Jean-Pierre De Miranda, Stouffville (CA); Matthew Mccausland, Milton (CA)

(73) Assignee: Scribble Technologies Inc., Toronto (CA)

( * ) Notice: Subject to any disclaimer, the term of this patent is extended or adjusted under 35 U.S.C. 154(b) by 307 days.

(21) Appl. No.: 13/856,414

(22) Filed: Apr. 3, 2013

(65) Prior Publication Data
US 2013/0268490 A1    Oct. 10, 2013

Related U.S. Application Data

(60) Provisional application No. 61/620,328, filed on Apr. 4, 2012.

(51) Int. Cl.
G06F 17/30 (2006.01)

(52) U.S. Cl.
CPC ... *G06F 17/30873* (2013.01); *G06F 17/30038* (2013.01); *G06F 17/3089* (2013.01); *G06F 17/30575* (2013.01); *G06F 17/30867* (2013.01)

(58) Field of Classification Search
CPC .............................................. G06F 17/30575
USPC .................................................. 707/627, 783
See application file for complete search history.

(56) References Cited

U.S. PATENT DOCUMENTS

| 5,625,818 | A  | * | 4/1997  | Zarmer ............... G06F 17/3089 707/707 |
| 6,643,663 | B1 | * | 11/2003 | Dabney ................. G06Q 10/10 707/707 |
| 6,772,396 | B1 | * | 8/2004  | Cronin ............... G06F 17/3089 345/629 |
| 8,769,524 | B2 | * | 7/2014  | Bhullar et al. ................ 717/173 |
| 2004/0199867 | A1 | * | 10/2004 | Brandenborg ......... G06Q 10/06 715/201 |
| 2004/0225730 | A1 | * | 11/2004 | Brown ............. G06F 17/30893 709/224 |
| 2005/0289461 | A1 | * | 12/2005 | Amado .................. G06Q 30/02 715/255 |
| 2006/0031746 | A1 |   | 2/2006  | Toepfer et al. |
| 2007/0011205 | A1 | * | 1/2007  | Majjasie ................ G06Q 10/00 707/707 |
| 2007/0245020 | A1 | * | 10/2007 | Ott ............................... 709/225 |
| 2007/0291297 | A1 | * | 12/2007 | Harmon ............... G06F 17/212 358/1.15 |
| 2008/0005666 | A1 |   | 1/2008  | Sefton et al. |

(Continued)

OTHER PUBLICATIONS

Facebook, Making it Easier to Share With Who You Want, Aug. 23, 2011.*

(Continued)

*Primary Examiner* — Robert Beausoliel, Jr.
*Assistant Examiner* — Alexandria Bromell
(74) *Attorney, Agent, or Firm* — Fenwick & West LLP

(57) ABSTRACT

The described embodiments provide methods and systems for generating online dynamic content. The methods and systems enable content from online publications to be efficiently reused and repurposed in other data collections and publications.

44 Claims, 15 Drawing Sheets

(56) References Cited

U.S. PATENT DOCUMENTS

| | | | |
|---|---|---|---|
| 2008/0103906 A1* | 5/2008 | Singh ............................. | 705/14 |
| 2009/0318192 A1* | 12/2009 | Leblanc ................. | G11B 27/10 |
| | | | 455/558 |
| 2010/0274622 A1 | 10/2010 | Kennedy et al. | |
| 2011/0202848 A1 | 8/2011 | Ismalon | |
| 2011/0246463 A1 | 10/2011 | Carson et al. | |
| 2012/0096041 A1* | 4/2012 | Rao et al. .................... | 707/794 |
| 2012/0150871 A1* | 6/2012 | Hua ................... | G06F 17/3087 |
| | | | 707/748 |
| 2012/0324349 A1* | 12/2012 | Pop-Lazarov et al. ....... | 715/256 |
| 2013/0179773 A1* | 7/2013 | Lee .............................. | 715/234 |

OTHER PUBLICATIONS

PCT International Search Report and Written Opinion, PCT Application No. PCT/CA2013/000292, Jul. 8, 2013, 10 pages.

* cited by examiner

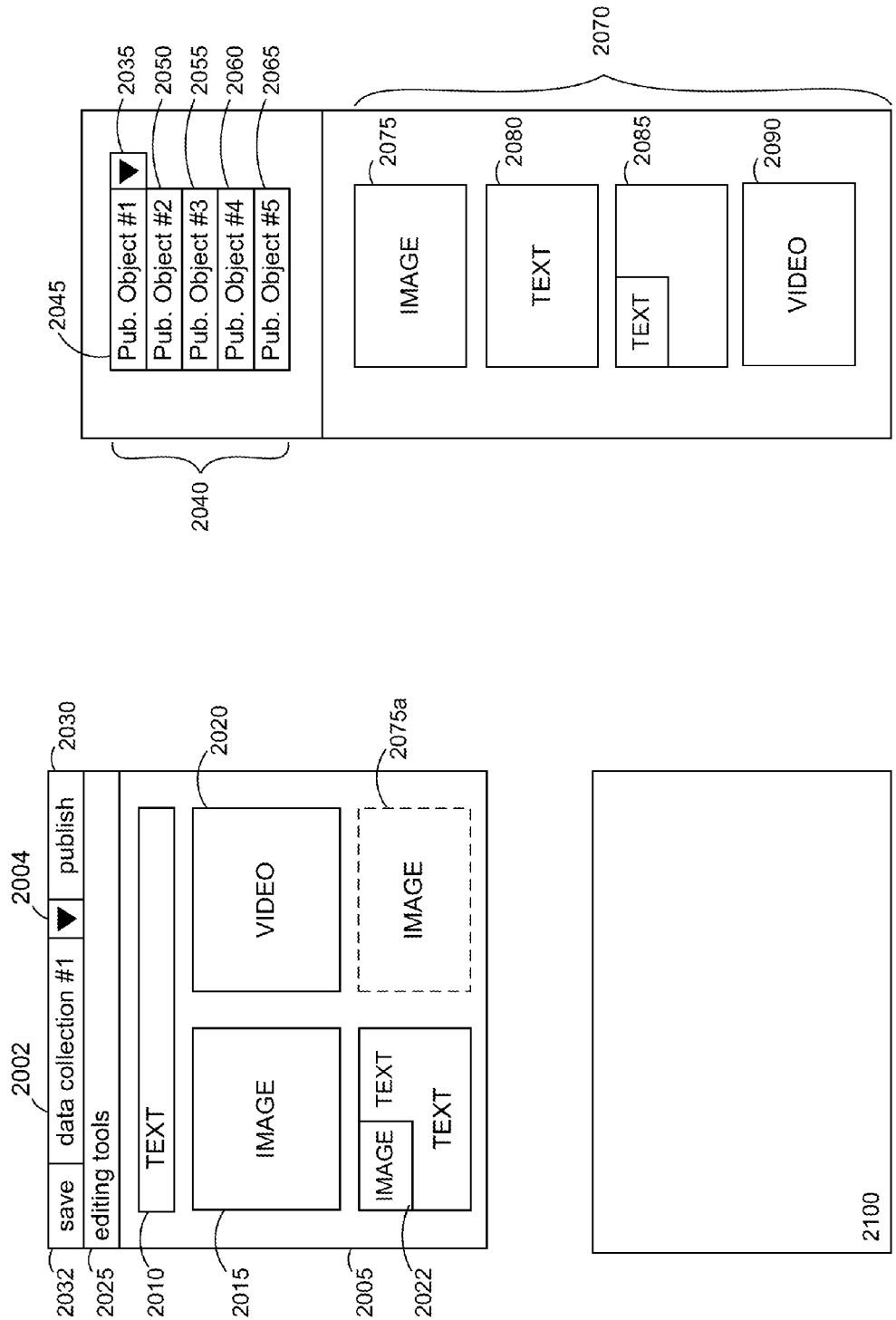

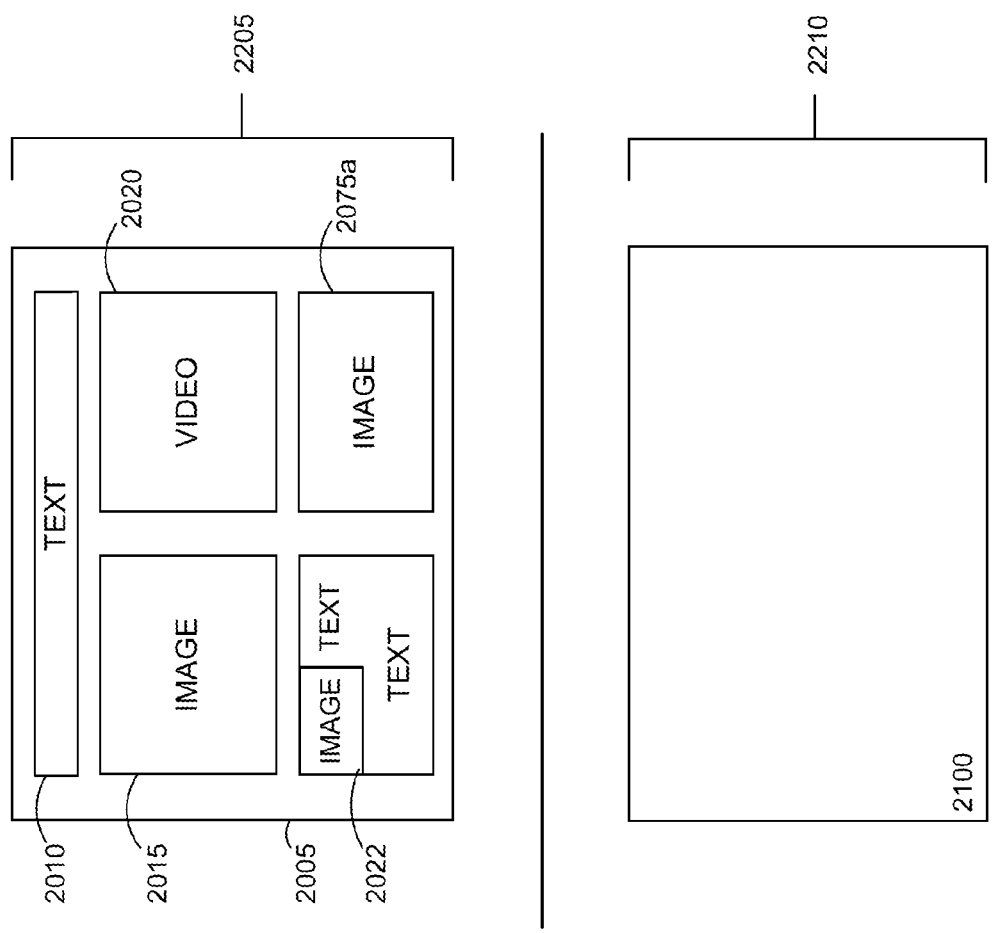

SYSTEM AND METHOD FOR GENERATING DIGITAL CONTENT

CROSS-REFERENCE TO RELATED APPLICATIONS

This application claims priority under 35 U.S.C. §119(e) to U.S. Provisional Patent Application Ser. No. 61/620,328, "System And Method For Generating Digital Content," filed Apr. 4, 2012.

FIELD

The described embodiments relate to methods and systems for generating digital content and in particular to methods and systems for generating, modifying, updating and publishing digital content.

BACKGROUND

Online publishers often employ a content management system (CMS) to manage workflows and publishing of news and entertainment content in a collaborative environment.

A CMS may be used in a live reporting scenario, for example, where an online publisher may wish to allow authorized individuals to directly report news regarding a current event. In another example, an online publisher may wish to encourage audience participation, by soliciting real-time comments and feedback in response to a live discussion. However, while conventional CMS systems might be adaptable to provide such features, frequent updating may require significant computing and bandwidth resources. One reason for this is that conventional CMS systems typically publish complete pages, which results in considerable redundancy when the complete page is repeatedly transferred to a client that is requesting frequent updates.

Users may wish to use a CMS to create and aggregate content such as web pages, papers, essays, stories, articles, posts, commentary, reviews, videos, and images, for example, and electronically publish the content for display on other user computing devices. The content may not be static and a user may update and republish the content. Multiple users may work together to create, aggregate, edit, update or moderate content. Multiple users work together to create, aggregate, edit, update or moderate content even when some or all of the users are in remote locations.

There is a need for an improved system and method for creating and managing online content that is dynamically changing in real-time.

SUMMARY

In a first aspect, there is provided a method of modifying and publishing a data collection, wherein the method is implemented at a publishing server connected to a network, wherein the publication server comprises a memory and a processor, and wherein the publishing server has access through the network to a database implemented using computer hardware: identifying a modifiable data collection, wherein the modifiable data collection is stored in the database; providing, using the network, a listing of one or more publication objects stored in the database, wherein each publication object is associated with one or more publication targets and comprises one or more data collections and data items stored in the database; receiving a first selected publication object from the listing of one or more publication objects; displaying a portion of the one or more data collections and data items of the first selected publication object; receiving a selected data collection or data item from the portion of the one or more data collections and data items of the first selected publication object; adding, using the content management module, the selected data collection or data item to the modifiable data collection; publishing, using the processor, the modifiable data collection as a publication object, wherein the publication object is associated with a publication target that is different than the one or more publication targets associated with the first selected publication object; and storing the publication object and the modifiable data collection in the database.

In accordance with embodiments described herein, the method may further involve identifying the modifiable data collection by creating a new data collection and storing the new data collection in the database, wherein the new data collection is the modifiable data collection.

In accordance with embodiments described herein, each data collection and data item is associated with a set of attributes, wherein the set of attributes includes a permissions attribute indicating whether the respective data collection or data item is permitted to be added to another data collection, and the method may further comprises: prior to adding the selected data collection or data item to the modifiable data collection, checking the permission attribute of the selected data collection or data item to determine whether the selected data collection or data item is permitted to be added to the modifiable data collection; and upon determining that the selected data collection or data item is permitted to be added to the modifiable data collection, adding the selected data collection or data item to the modifiable data collection.

In accordance with embodiments described herein, each data collection and data item is associated with a set of attributes, the set of attributes includes a permissions attribute indicating whether the respective data collection or data item is permitted to be displayed and added to another data collection, and the method may further comprise: for each data collection or data item of the portion the one or more data collections and data items: prior to displaying the respective data collection or data item in the portion, checking the permission attribute of respective data collection or data item to determine whether the respective data collection or data item is permitted to be displayed and added to the modifiable data collection; and upon determining that the respective data collection or data item is permitted to be displayed and added to the modifiable data collection, displaying the respective data collection or data items as part of the portion of the one or more data collections and data items of the first selected publication object.

In accordance with embodiments described herein, each publication object is associated with a set of attributes, the set of attributes includes a permissions attribute indicating whether the respective publication object includes contents permitted to be added to another data collection, and the method may further comprise: for each publication object to be identified in the listing of one or more publication objects: prior to identifying the respective publication object in the listing, checking the permission attribute of the respective publication object to determine whether the respective publication object includes contents permitted to be added to another data collection; and upon determining that the selected data collection or data item is permitted to be added to the modifiable data collection, identifying the publication object in the listing.

In accordance with embodiments described herein, the method may further involve adding the selected data collection or data item to the modifiable data collection by modifying the selected data collection or data item for the modifiable data collection.

In accordance with embodiments described herein, the method may further involve adding the selected data collection or data item to the modifiable data collection by reformatting the selected data collection or data item for the modifiable data collection.

In accordance with embodiments described herein, the method may further involve providing a rules engine of rules defining whether, for each data item and data collection, the data item or data collection is permitted to be added to the modifiable data collection; prior to adding the selected data collection or data item to the modifiable data collection, using the rules engine to determine whether the selected data collection or data item is permitted to be added to the modifiable data collection; and upon determining that the selected data collection or data item is permitted to be added to the modifiable data collection, adding the selected data collection or data item to the modifiable data collection.

In accordance with embodiments described herein, each data collection and data item is associated with one or more source identifiers for tracking publication of the respective data collection or data item, wherein each source identifier refers to a publication object publishing the respective data collection or data item, and the method may further comprise: associating the selected data collection or data item with a source identifier referring to the publication object publishing the modifiable data collection.

In accordance with embodiments described herein, the publication object may correspond to a live event stream, wherein the live event stream is a real-time aggregate of content relating to an event, wherein the live event stream comprises data collections corresponding to live articles about the event, wherein the live articles have real-time updates.

In accordance with embodiments described herein, the publication object corresponds to a live blog, wherein the live blog comprises data collections corresponding to blog posts.

In accordance with embodiments described herein, the method may further involve receiving a second selected publication object of the listing of one or more publication objects; displaying a portion of the one or more data collections and data items of the second selected publication object; receiving a selected data collection or data item from the portion of the one or more data collections and data items; adding the selected data collection or data item to the modifiable data collection; and updating the publication object based on the modifiable data collection.

In accordance with embodiments described herein, the method may further involve adding the selected data collection or data item to the modifiable data collection by adding a reference to the modifiable data collection, wherein the references identifies a location of the selected data collection or data item in the database.

In accordance with embodiments described herein, the method may further involve modifying the selected data collection or data item in the database, wherein the first selected publication object reflects the modification to the selected data collection or data item, and wherein the modifiable data collection reflects the modification to the selected data collection or data item based on the reference.

In accordance with embodiments described herein, the method may further involve adding the selected data collection or data item to the modifiable data collection comprises: making a copy of the original selected data collection or data item and adding the copy of the selected data collection or data item to the modifiable data collection.

In accordance with embodiments described herein, the selected data collection or data item is associated with a set of attributes defining metadata for the data collection or data item, and wherein adding the selected data collection or data item to a new data collection may comprise making a copy of the set of attributes and associating the copy of the set of attributes with the copy of the selected data collection or data item.

In accordance with embodiments described herein, the method may further involve modifying the copy of the selected data collection or data item, wherein the original selected data collection or data item is not modified when the copy of the selected data collection or data item is modified.

In accordance with embodiments described herein, the method may further involve linking the original selected data collection or data item to the copy of the selected data collection or data item; modifying the copy of the selected data collection or data item; modifying the original selected data collection or data item based on the modification to the copy of the selected data collection or data item using the linking.

In accordance with embodiments described herein, the method may further involve modifying the original selected data collection or data item, wherein the copy of the selected data collection or data item is not modified when the original selected data collection or data item is modified.

In accordance with embodiments described herein, the method may further involve linking the original selected data collection or data item to the copy of the selected data collection or data item; modifying the original selected data collection or data item; modifying the copy of the selected data collection or data item based on the modification to the original selected data collection or data item using the linking.

In accordance with embodiments described herein, the method may further involve detecting that a predetermined action occurs involving the selected data collection or data item and another data collection or data item in the modifiable data collection; generating a slideshow comprising the selected data collection or data item and the other data collection or data item; adding the slideshow to the modifiable data collection; and updating the publication object based on the slideshow in the modifiable data collection.

In accordance with embodiments described herein, the predetermined action includes the selected data collection or data item moved to a position on top of the other data collection or data item in the modifiable data collection.

In accordance with embodiments described herein, the method may include publishing the modifiable data collection as the publication object for display on each of a plurality of client devices; receiving at least one modification of the modifiable data collection; storing the at least one modification of the modifiable data collection in the database; detecting the at least one modification of the modifiable data collection in the database; if the at least one modification is detected, generating a modification representation identifying the at least one modification of the modifiable data collection, wherein the modification representation is a data structure suitable for instructing each of the plurality of client devices to update the publication object with the modification to the modifiable data collection; transmitting the modification representation to a server system; and distributing the modification representation from the server system to the plurality of client devices, wherein the modification representation updates the previously published publication object independently for each of the plurality of client devices.

In accordance with embodiments described herein, if the at least one modification is detected, the method may generate at least one indication that the at least one modification has occurred.

In accordance with embodiments described herein, the method may involve transmitting the at least one indication to the server system for distribution.

In accordance with embodiments described herein, the at least one indication is a file comprising a unique identifier. In accordance with embodiments described herein, the unique identifier is a timestamp.

In accordance with embodiments described herein, the modification representation identifies only modifications that occurred within a predetermined interval window.

In accordance with embodiments described herein, the modification representation comprises data for recreating the at least one modification.

In accordance with embodiments described herein, the method may involve associating a template with the modifiable data collection.

In accordance with embodiments described herein, the detecting occurs asynchronously to the generating the modification representation.

In accordance with embodiments described herein, the detecting occurs asynchronously to the transmitting the modification representation.

In accordance with embodiments described herein, the method may involve periodically receiving a request from a client device for an indication that a modification to one or more data items has occurred; after detecting the at least one modification, generating an indication comprising a unique identifier indicating when the at least one modification occurred; and in response to the request and after generating the indication, transmitting the indication to the client device to notify the client device that the at least one modification has occurred.

In accordance with embodiments described herein, the method may further involve: periodically receiving a request for a modification representation at the server system from a client device; wherein the distributing for the respective client device occurs in response to the request and after the modification representation is transmitted to the server system.

In accordance with embodiments described herein, the publication object may have a code object for periodically retrieving a modification representation to update the data collection.

A method of providing a user interface on a client device for modifying and publishing a data collection, wherein the client device comprises a processor and a memory coupled to the processor and configured to store instruction executable by the processor, wherein the client device is connected to a network to interact with a publishing server and a database, wherein the method comprises: displaying, as part of the user interface, a graphical representation of a modifiable data collection, wherein the modifiable data collection is stored in the database; displaying, as part of the user interface, a graphical representation of a listing of one or more publication objects received from the publishing server, wherein each publication object is associated with one or more publication targets and comprises one or more data collections and data items stored in a database; receiving, at the user interface, a first selected publication object from the listing of one or more publication objects; providing the first selected publication object to the publishing server; updating the user interface to display a graphical representation of a portion of the one or more data collections and data items of the first selected publication object; receiving, at the user interface, a selected data collection or data item from the portion of the one or more data collections and data items of the first selected publication object; updating the user interface to display a reproduction of the selected data collection or data item as part of the graphical representation of the modifiable data collection; receiving, at the user interface, a command to publish the modifiable data collection as a publication object, wherein the publication object is associated with a publication target that is different than the one or more publication targets associated with the first selected publication object; and transmitting the modifiable data collection with the selected data collection or data item to the publication server.

In another aspect, embodiments described herein may provide a system for modifying and publishing a data collection, a database storing at least one modifiable data collection and a plurality of publication objects, wherein each publication object is associated with one or more publication targets and comprises one or more data collections and data items; a publishing server comprises a memory and a processor, wherein the publishing server is configured to: identify the modifiable data collection; provide a listing of one or more publication objects; receive a first selected publication object from the listing of one or more publication objects; provide a portion of the one or more data collections and data items of the first selected publication object; receive a selected data collection or data item from the portion of the one or more data collections and data items of the first selected publication object; add the selected data collection or data item to the modifiable data collection by using the content management module to update the database; publish, using the processor, the modifiable data collection as a publication object, wherein the publication object is associated with a publication target that is different than the one or more publication targets associated with the first selected publication object; and store the publication object and the modifiable data collection in the database using the content management module; and a network to connect the publishing server and the database.

In another aspect, there is provided a method of managing online content wherein the content comprises a data collection identified in a database having one or more data items associated therewith. The method may comprise periodically interacting with the database to identify at least one modification of the one or more data items; if the interaction identifies the at least one modification, generating, using a processor, a modification representation associated with the data collection, the modification representation identifying the at least one modification of the one or more data items; and storing the modification representation. The interaction may involve polling, pushing, or other technical mechanisms.

In some cases, the one or more data items are also associated with a second data collection, and the method further comprises, if the interaction identifies the at least one modification, generating, using the processor, a second modification representation associated with the second data collection, the second modification representation identifying the at least one modification of the one or more data items; and storing the second modification representation.

The method may further comprise, if the interaction identifies the at least one modification, generating at least one indication that the at least one modification has occurred. The method may further comprise transmitting the at least one indication to a server. In some cases, the at least one indication is a file comprising a unique identifier. The unique identifier may be a timestamp.

In some cases, the modification representation identifies only modifications that occurred within a predetermined interval window. In some cases, the modification representation comprises data for recreating the at least one modification.

In some cases, the at least one modification may comprise an addition of a data item to the one or more data items, a deletion of a data item from the one or more data items, or a change to a data item in the one or more data items.

Storing the modification representation may comprise transmitting the modification representation to a server.

The method may further comprise, prior to generating the modification representation, receiving input data; processing the input data to generate the one or more data items; and associating the one or more data items with the data collection in a database. The method may further comprise transmitting an initial representation of the one or more data items to a server, and/or associating a template with the data collection.

In some cases, the interaction occurs asynchronously to the generating the modification representation, or asynchronously to the storing the modification representation.

In some cases, the server is part of a content distribution network.

In another broad aspect, there is provided a method of updating one or more data items at a client device, the one or more data items associated with content for an online publication wherein the content comprises a data collection identified in a database. The method may comprise receiving an initial representation of the one or more data items from a server; displaying an output based on the initial representation; receiving a modification representation, the modification representation identifying at least one modification of the one or more data items; generating, using a processor of the client device, a current representation of the one or more data items based on the initial representation and the modification representation; and updating the output based on the current representation.

The method may further comprise, prior to receiving the modification representation, periodically interacting with the database for an indication that the at least one modification has occurred and, if the indication indicates that the at least one modification has occurred, then receiving the modification representation.

In some cases, the modification representation comprises data for recreating the at least one modification.

In some cases, the at least one modification may comprise an addition of a data item to the one or more data items, a deletion of a data item from the one or more data items, or a change to a data item in the one or more data items.

In some cases, the initial representation comprises computer-executable instructions for causing the processor to perform the periodic interaction with the database and receive the modification representation.

The method may further comprise, if a number of the data items to be displayed in the current representation exceeds a predetermined limit of data items, paginating the current representation.

In some cases, paginating the current representation comprises subdividing the one or more data items into two or more groups of data items and displaying only a most recent group of data items, and wherein each of the groups is sized according to the predetermined limit of data items. Each of the groups may have a unique URL. The URLs for each of the two or more groups of data items may be displayed in reverse chronological order when live and displayed in forward chronological order when not live. Paginating may be delayed until the number of data items displayed in the current representation exceeds the predetermined limit of data items by a predetermined threshold. The predetermined threshold may be 20%.

The method may further comprise, prior to displaying the output, receiving a template from a template server, wherein the initial representation and the current representation are generated based also on the template. The template may be associated with the data collection in the database. The template may comprise a content marker, and the method may further comprise identifying a location of the content marker in the template, wherein the current representation can be generated by modifying the template to display the one or more data items substantially at the location of the content marker.

In another broad aspect, there is provided a method of generating content in response to a client request, the content comprising a one or more data items associated with a data collection. The method may comprise determining if a current template associated with the data collection exists; if the current template exists, generating an initial representation of the data collection based on the template; determining if the current template should be updated; and if the current template should be updated, initiating a template update comprising: requesting a new template from a template server; verifying the new template; and if the verifying is successful, updating the current template based on the new template.

In some cases, the template update is initiated in a new thread or process. In some cases, the verifying comprises identifying a content marker in the new template.

In another broad aspect, there is provided a system for scalable publishing of online content. The system may comprise a database, the database for identifying a data collection having one or more data items associated therewith; a publishing server, the publishing server configured to identify modifications to the data collection; a storage system for storing the data collection; a content management module, the content management module configured to determine that the modifications to the data collection have been identified and to transmit the modifications to the data collection to the storage system; and a content distribution network for caching and delivering the data collection.

In another broad aspect, there is provided a system for scalable publishing of online content. The system may comprise a database, the database for identifying a data collection having one or more data items associated therewith; a publishing server; a storage system; a content management module, the content management module configured to: periodically interact with the database to identify at least one modification of the one or more data items; if the interaction identifies the at least one modification, generate a modification representation associated with the data collection, the modification representation identifying the at least one modification of the one or more data items; and transmit an indication of the modification representation to the storage system; and a content distribution network for caching and delivering the data collection stored at the storage system.

In another broad aspect, there is provided a method of dynamic templating for online content wherein the content comprises a data collection identified in a database having one or more data items associated therewith. The method may comprise determining that a current template object is to be updated; requesting a new template object from a third-party server; receiving the new template object from the third-party server; processing, using a processor, the new template object to determine a content location in the new template object; updating the current template object based on the new template object after processing; and generating the online content using the data collection and the current template object as updated.

In another broad aspect, there is provided a method of publishing online content wherein the content comprises a data collection identified in a database having one or more data items associated therewith. The method may comprise storing a list of one or more publication targets; receiving a selection of publication targets from the one or more publication targets; determining one or more template objects associated with the selection of publication targets; generating a publication object, based on the data collection, for each of the selection of publication targets, formatting the publication object based on the associated template object and transmitting the publication object to a location associated with a respective publication target.

BRIEF DESCRIPTION OF THE DRAWINGS

A preferred embodiment of the present invention will now be described in detail with reference to the drawings, in which:

FIG. 13 illustrates an exemplary interface for modifying and publishing a new data collection as a publication object; and FIG. 14 illustrates an exemplary publication objection.

Figure 1:
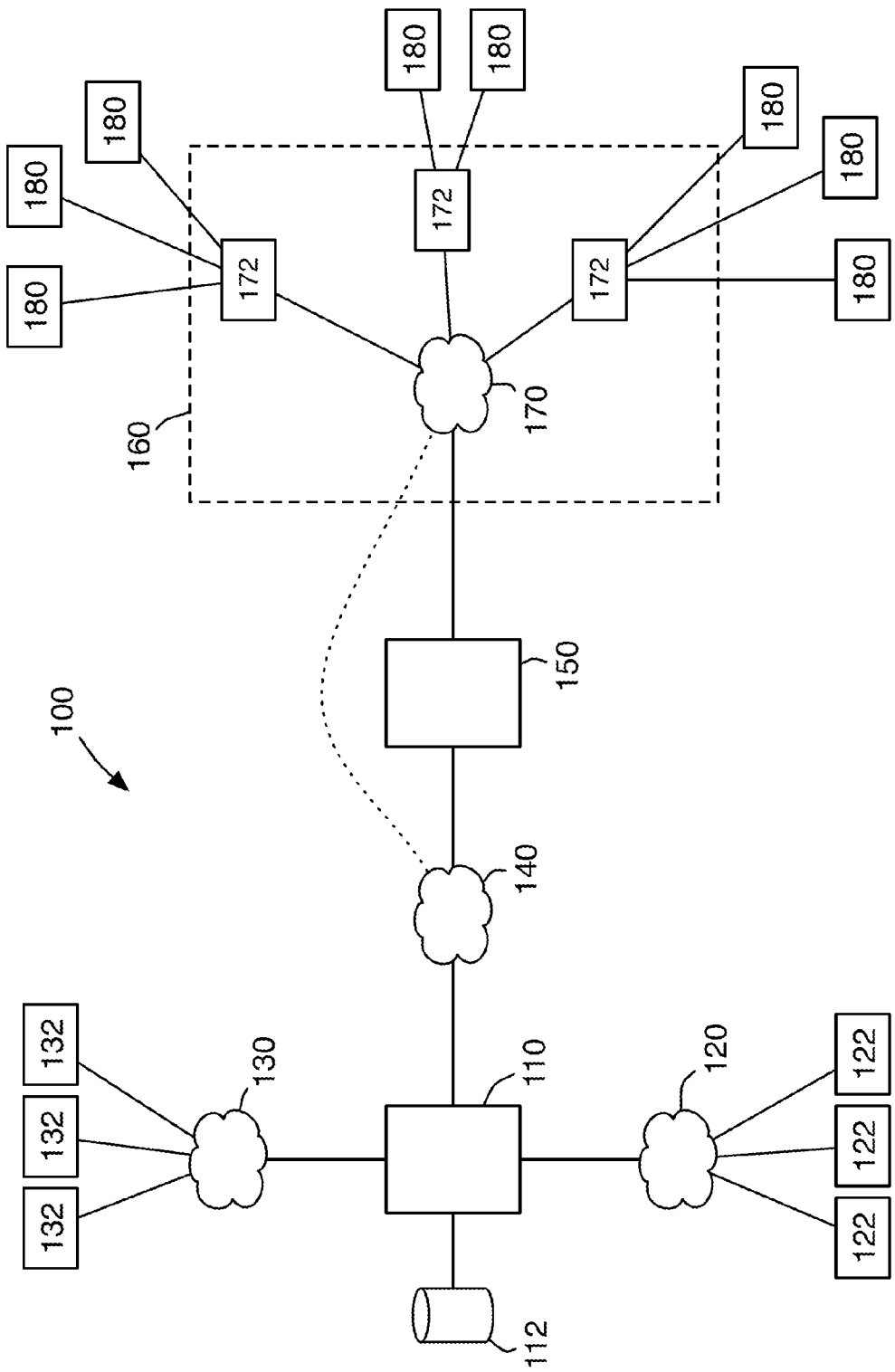
FIG. 1 illustrates a simplified schematic diagram of an exemplary content publishing system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EXEMPLARY EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), and at least one communication interface. For example and without limitation, the programmable computers may be a server, network appliance, set-top box, embedded device, computer expansion module, personal computer, laptop, personal data assistant, or mobile device. Program code is applied to data to perform the functions described herein and generate output. The output is applied to one or more output devices as described herein, or in known fashion. In some embodiments, the communication interface may be a network communication interface. In embodiments where elements of the invention are combined, the communication interface may be a software communication interface, such as those for inter-process communication (IPC). In still other embodiments, there may be a combination of communication interfaces.

Each program is preferably implemented in a high level procedural or object oriented programming and/or scripting language to communicate with a computer system. However, the programs can be implemented in assembly or machine language, if desired. In any case, the language may be a compiled or interpreted language.

The systems, processes and methods of the described embodiments are capable of being distributed in a computer program product comprising a non-transitory computer readable medium that bears computer usable instructions for one or more processors. The medium may be provided in various forms, including one or more diskettes, compact disks, tapes, chips, magnetic and electronic storage media, and the like. The systems, processes and methods of the described embodiments may also be provided using a Software-as-a-Service (SaaS) model. The computer useable instructions may also be in various forms, including compiled and non-compiled code.

Reference is first made to FIG. 1, in which there is shown a simplified schematic diagram of an exemplary content publishing system 100.

Content publishing system 100 comprises a dynamic publishing server 110, which may comprise a database 112. Content publishing system 100 can be configured to publish digital content (e.g., a publication object comprising one or more data collections or data items), which can be retrieved by clients and assembled into complete pages.

A data collection can comprise one or more data items. In some cases, a data collection may comprise one or more other data collections, in addition to other data items. For example, a data collection may be a live blog relating to an event that may include other data collections, such as blog entries or posts, which in turn data items, such as images, audio, text, video, data feeds, and so on. In the context of dynamic content, the data items in a data collection may be modified in real time. In particular, new data items may be added to the data collection and existing data items in the data collection may be changed or deleted. As will be described herein, a new data collection may be created by reusing, repurposing, and retailoring existing data collections and data items from published content (e.g. publications objects including one or more data collections or data items), such as other live blogs about events, for example.

In general, a data collection may comprise any reference to one or more data items or data collections. In some cases, the reference may be one or more specific references, and individual data items in the data collection may be identified with indices, tokens, tags or other suitable identifiers.

For example, a unique index can provide an address to facilitate look-ups for a particular data item. An index may be one or more attributes used to identify the object, a hash value, or a unique token, such as a series of reference characters, that can be used to directly or indirectly identify the data item. An index may include different kinds of values depending on the data item, such as a token for one data item and a positional value for another data item. The index for a data item may also include multiple values, such as both a token and a positional value for one data item. A positional value may be defined as in relation to other data items.

The data collection may also comprise one or more references in the form of a search query comprising one or more keywords, where the keywords may serve to identify data items relating to a particular event, topic, keyword or other grouping mechanism. Each of the data items identified via a search query may still have an identifier (e.g., index, token, tag, etc.).

The data collection may also comprise additional properties or metadata, defined by an attribute set for the data collection, as described herein.

In some embodiments, the data collection may be provided as a block of HTML content.

Individual data items may comprise characters and text (e.g., captions, tags, prose, etc.), images, audio, video content, data feed content, computing applications, and so on. In some cases, data items may also comprise executable instructions (e.g., JavaScript). In some cases, data items may provide a reference identifier for a specific content file.

For the purposes of exposition, the terms 'content' and 'data collection' may be used interchangeably herein.

Dynamic publishing server 110 may provide frequent updates to a publication object without the resource burden that might be incurred by a conventional CMS. A publication object can comprise one or more data collections and their associated data items, and may take the form of HTML content, including formatting and scripts. In some cases, a publication object may form the entire contents of a web page.

Publication objects may be contrasted with publication targets. Publication targets can be a specific web page, a web site directory, an embeddable object such as a Flash™ object, or the like.

In general, a publication target is the location that a publication object is, or will be, published. Accordingly, if the publication object is a complete web page, the publication target may be a web site directory. Conversely, if the publication object is a block of HTML content, the publication target may be a portion of a specific web page where the block of HTML content is to be inserted or embedded.

Dynamic publishing server 110 may be connected to one or more networks 120, 130 and 140. In some cases, networks 120, 130 or 140 may form parts of a single larger network, such as the Internet, or may be selectively interconnected with each other. One or more of networks 120, 130 or 140 may be a wired or wireless local area network, a wide area network, a virtual private network, a mobile data network or other suitable network for facilitating data communication.

One or more input devices 122 communicate directly or indirectly with dynamic publishing server 110 via network 120. Input devices 122, which may also be referred to as client devices or writer devices, may be communication or computing devices, such as desktop or laptop computers, mobile devices, telephones and the like. In some cases, input devices 122 may be additional content publishing systems 100, which can be federated. Input device 122 (also referred to as client device) may be any networked computing device including a processor and memory, such as a personal computer, workstation, server, portable computer, mobile device, personal digital assistant, laptop, smart phone, WAP phone, an interactive television, a smart television, video display terminals, gaming consoles, an electronic reading device, and portable electronic devices or a combination of these.

In some cases, dynamic publishing server 110 may have a local input device 122, which can be an alternative input interface. For example, dynamic publishing server 110 may have a telephony (including VOIP) or voicemail system for recording voice messages, or may integrate with such a system. Accordingly, voice messages may be used as input, or transcribed and used as input. Subsequently, the voice messages may be published in audio form, or transcribed and published in written form. Such features may be beneficial in situations where access to the dynamic publishing server 110 by data communication means is impractical or otherwise restricted (e.g., due to Internet faults or censorship).

In some cases, an input device 122 may be configured to extend services to one or more additional input devices. For example, an input device 122 may aggregate input data from one or more additional input devices that are on a local network, and transmit the aggregated data to dynamic publishing server 110.

Similarly, one or more publishing partners 132 may be connected to dynamic publishing server 110 via network 130. Publishing partners 132 may be content publishing servers or services, such as public or private web sites, content management systems and the like. Examples of publishing partners 132 include news and entertainment publishing organizations, news aggregators, photo sharing websites, social networks, and other content providers. In general, any party that creates or manages a publication object, or which provides a data collection or data item, may be considered a publishing partner 132. Accordingly, freelance journalists, photographers and the like may also be publishing partners 132. In some cases, input devices 122 may also be considered publishing partners 132.

In some cases, publishing partners 132 may include telephony (including voice over IP) services. Accordingly, published content may be in, or converted to, audio form. Likewise, input content may be received in, or converted to, audio form.

It will be appreciated that dynamic publishing server 110 may also comprise one or more primary servers and one or more caching servers, to reduce processing load on the primary servers. For example, dynamic publishing server 110 may comprise a server dedicated to one or more publishing partners 132.

Optionally, dynamic publishing server 110 may be connected to storage system 150 via network 140. Storage system 150 can be configured to store or distribute content over the Internet, or the World-Wide Web in particular, in a scalable manner. In particular, storage system 150 can be a cloud-based web storage and retrieval system, such as Amazon™ Simple Storage Service (S3).

Storage system 150 can be a caching server, a distributed storage system, a storage service, a content distribution network or content delivery network (CDN), reverse proxy, or the like.

Dynamic publishing server 110 or, optionally, storage system 150 can be connected to a CDN 160. CDN 160 can be a specialized distribution network adapted to synchronize and distribute content to a plurality of geographically distributed edge nodes, to facilitate scalable, high availability and low latency delivery to a large number of end users.

CDN 160 may comprise a core network 170 for interconnection with a plurality of edge nodes 172. The internal structure of CDN 160 may be structured in a tiered or other fashion, as will be appreciated by those skilled in the art.

A plurality of clients 180 can connect to CDN 160. In general, CDN 160 is configured to identify the edge node 172 that is nearest, or which can provide the best quality of service, to a particular client 180.

By utilizing CDN 160 and storage system 150, dynamic publishing server 110 can be insulated from the effects of high demand for services from end user clients. Likewise, dynamic publishing server 110 can be designed to provide scalability, high availability and low latency delivery independently of the number of end user clients. In particular, the bandwidth requirement for dynamic publishing server 110 can be dependent simply on the amount of content being published. Likewise, by using CDN 160 and/or storage system 150, dynamic publisher server 110 can serve a large number of clients without the corresponding requirement to open a large number of sockets, service a large number of requests per second, and the like. In contrast, storage system 150 and CDN 160 can distribute content to a large number of end user clients and can be scaled to respond to large fluctuations in demand.

When a data collection is updated with new or changed data items, or a data item is deleted, dynamic publishing server 110 may transmit a modification representation corresponding to the data collection, once, to storage system 150 or CDN 160, whereupon storage system 150 or CDN 160 can distribute to a large number of users, according to their respective designs. Publication of content is described in further detail herein, for example with reference to FIG. 6.

For ease of reference, the functionality of dynamic publishing server 110, storage system 150 and CDN 160 are described herein as being provided by separate servers. However, the functionality of one or both of storage system 150 and CDN 160 may be integrated into dynamic publishing server 110, or omitted entirely. Likewise, storage system 150 may be configured to provide some or all of the functionality of CDN 160, and vice versa. For example, storage system 150 may employ the Amazon™ S3 service to provide scalability, high availability, and low latency delivery.

Content publishing system 100 may be adapted to publish content in real-time. In particular, content publishing system 100 may publish publication objects containing data collections comprising one or more data items. The data collections may comprises data items that are associated chronologically, by topic or otherwise. For example, the data collections may relate to a live content stream, a live question & answer session, a live interview, updates on a current event, and the like. Alternatively, the content published in real-time may take the form of a rapidly changing news article or other non-chronological data format (e.g., an article with real-time updates). Content publishing system 100 may be further adapted to create new data collections using data collection and data items from other publication objects, and publish the new data collection as a new or updated publication object. Accordingly, content publishing system 100 enables existing data collections and data items to be reused, retailored, repurposed, and modified in order to create new data collections.

In some cases, content publishing system 100 may also be adapted to publish other content, such as advertisements, pre-written content or other static content.

Figure 2:
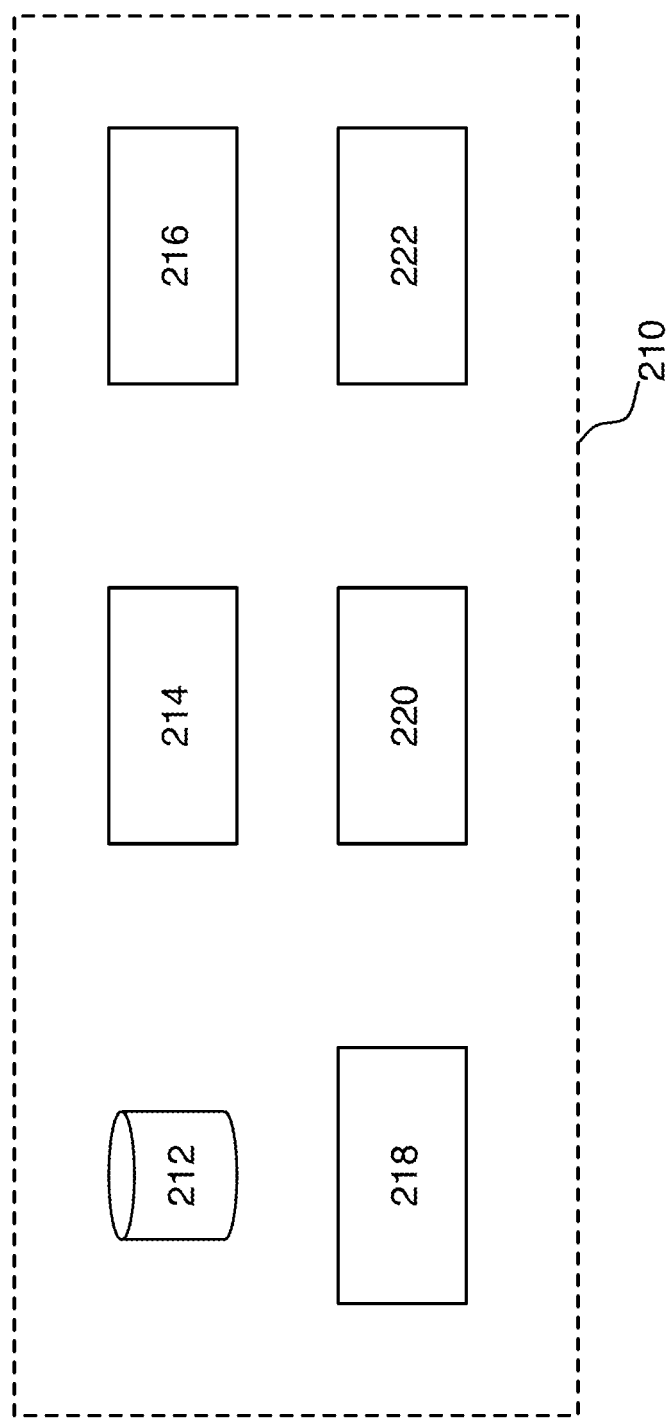
FIG. 2 illustrates a block diagram of modules in an exemplary dynamic publishing server, such as that of FIG. 1.

Referring now to FIG. 2, there is shown a block diagram of modules comprised in an exemplary dynamic publishing server. Dynamic publishing server 210, which may be the same or similar to dynamic publishing server 110, can comprise a database 212, a permission module 214, a content input module 216, a template module 218, a content management module 220 and a publication module 222.

Database 212 may comprise one or more relational databases (e.g., SQL) or, in some cases, a flat file database (e.g., NoSQL). Database 212 may be used to store data used by dynamic publishing server 210, including accounts and permission data for users, writers and administrators, template data, data referring to publication objects, data collections, data items, and other data.

Permission module 214 may be used to store and manage system permissions relating to providing content to dynamic publishing server 210, such as permissions associated with a user computer (e.g., permissions associated with users, commenters and administrators). Permission module 214 may also be used to store and manage system permissions associated with data collections and publication objects, such as, for example, publication times for a publication object. In general, permission module 214 may operate in similar fashion as the permissions system of other content management systems (CMS), in which writers, administrators, commenters and end users are provided with varying degrees of access according to security considerations and content accessibility needs.

Content input module 216 may be used to manage the reception of input data for processing and generation of data items by dynamic publishing server 210. Operation of content input module 216 is described in further detail herein, for example with reference to FIG. 5.

Template module 218 may be used to manage the retrieval and processing of publication templates by dynamic publishing server 210. Operation of template module 218 is described in further detail herein, for example with reference to FIG. 7.

Content management module 220 may be used to process data items for publication, such as those data items generated by content input module 216. Operation of content management module 220 is described in further detail herein, for example with reference to FIG. 6.

Publication module 222 may be used to create and configure a publication object, for the publication of one or more data items associated with a data collection. For example, publication module 222 may be used to identify a data collection (and the associated one or more data items) and create and configure a publication target for publishing the one or more data items. As noted, a publication target can be a specific web page, a web site directory, an embeddable object such as a Flash™ object, or the like.

In one example, a publication target can be a web page that will contain a publication object created for a live event. Ongoing updates may be provided by one or more writers in the form of input data, which can be used to generate modified (including new or updated) data items, and which may be associated with one or more data collections (in turn associated with the publication object created for the live event). Accordingly, publication module 222 may be configured to process and publish the data items in a suitable manner via the publication targets.

Figure 3:
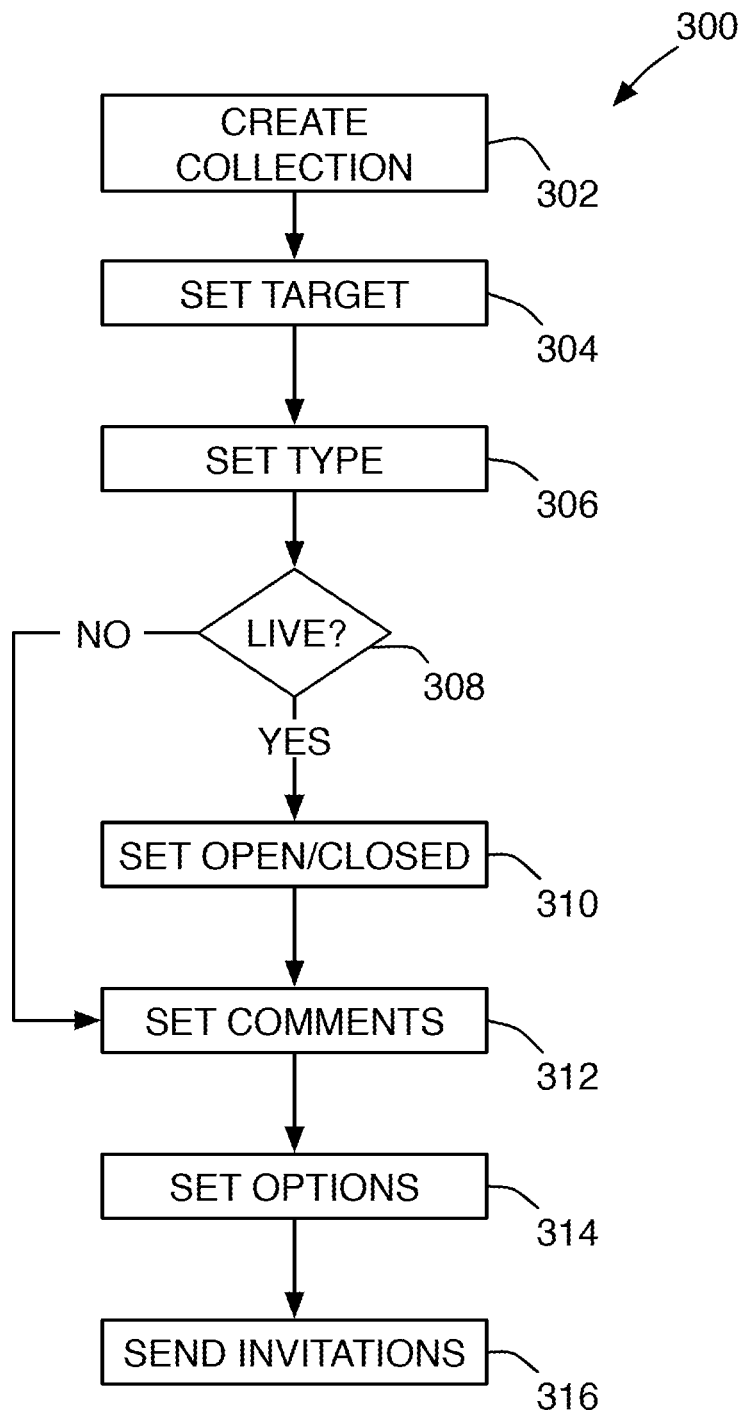
FIG. 3 illustrates a process flow diagram for creating an exemplary publication object.

Referring now to FIG. 3, there is shown a process flow diagram for creating an exemplary publication object, which may be performed by publication module 222. Each publication object can have one or more associated data collections.

Creation process 300 begins by creating a new data collection at 302. For example, the data collection may be created by generating a new data collection entry in a database, such as database 212. However, in some cases, a data collection need not be created in the database. For example, the data collection may comprise one or more rules for identifying associated content such as social network posts containing one or more query terms, posts from the same geographic area (e.g., based on geographically-identifying data associated with the post), and posts in the same language.

One or more publication targets can be configured at 304. As described, a publication target may be a web page, a web site, an embeddable object such as a Flash™ object, or the like. Each publication target can be preconfigured by an administrator and may be displayed to a user, for example, as a descriptive name, a domain, a subdomain, a URL or some portion of a URL (e.g., shortened path name or file name). Each publication target may have one or more user-selectable template objects associated therewith.

Template objects may be received from template servers, which may be websites belonging to third parties associated with particular publication targets, and processed to generate a template for publishing a publication object (and its data collections and associated data items). For example, if a publication target is live.example.com, another website at www.example.com may be the template server. Accordingly, a template may be retrieved from, for example, www.example.com/template.html and data items published at the publication target of live.example.com may be formatted based on the retrieved template.

Each publication object may have one or more publication targets. Accordingly, each publication object may be published to one or more locations and, if the publication targets have different templates, the publication object may be formatted differently, depending on the publication target.

A publication object may be prepared in advance in anticipation of publication at a later time, for example by identifying a known data collection (e.g., a search query). In some cases, the data collection may be associated with a "live event", in which case it may be used to aggregate, in real time, content relating to a specific topic (e.g., submitted by users viewing one or more web pages). Examples of such live events include, for example, reporting news on a current event, a live question & answer session with a person of interest, and the like. Optionally, at 306, the publication type of the publication object may be selected. The publication type may be set to "live", "dynamic search", or some other value as may be appropriate.

The publication time for the publication object may also be configured. The publication time may be immediate, deferred until a predetermined future time (e.g., if the data collection is in a draft or prepublication state), or it may indicate that the publication object should not be published at all (e.g., if its data collection relates to system messages, private metadata, or the like).

If the publication type indicates that the object relates, for example, to a live event, and a determination is made that the object relates to a live event at 308, a start and end time of the publication may be chosen. The start time indicates when the scheduled event will begin and the live event is considered "open". Conversely, the end time indicates when the scheduled event will end and the event is considered "closed". The "open" or "closed" state of the event may be used to control other features, such as commenting, or to alter the appearance of the published data items. For example, when an event is "open", published data items may appear in reverse chronological order, such that newly-added data items appear above older data items. Correspondingly, when an event is "closed", data items may appear in chronological order, for ease of reading.

Alternatively, the start and end time of the publication object may be used to determine if the data collection relates to a live event. For example, if the current time is between the start time and the end time, the publication object may be considered "live" and the data items associated with the data collection may be published accordingly.

Alternatively, or in addition to 310, the publication object may be manually configured by an administrative user to specify that the object is "open" or "closed", at 312. In such cases, start and end times may be optional and not configured. In some cases, the publication object may be configured to automatically become "closed", for example after a predetermined period has passed without any activity.

If the publication type is not a live event, the process may proceed directly to configuration of user commenting at 312. If user commenting is enabled for a publication object, end users viewing the data collection (e.g., at a publication target) may be enabled to submit comments regarding the data collection. In some cases, commenters may also submit content via external sources, such as e-mail, Twitter™, Facebook™ and the like. However, some templates may prevent user commenting in certain cases, even if user commenting is enabled.

User comments may be input data that is submitted by third party end users, and which may be used to create additional user-generated data items associated with the data collection. In some cases, user-generated data items originating from the user comments may simply be aggregated with other data items originating from writer devices (e.g., input devices 122) and other authorized users (e.g., those that are already registered with the dynamic publishing system). The user-generated data items may be distinguished from writer-generated data items using a distinct visual or audible presentation, such as a different color scheme or the like.

In some cases, a live query may be configured to generate user comments based on external content, such as e-mail, Twitter and the like.

In some other cases, user-generated data items may be held for approval by a writer or administrator. The writer or administrator may approve certain of the user-generated data items, which may then be published.

In some cases, writer-generated data items may be processed in the same manner as user-generated data items, and vice versa.

In cases where user-generated data items can be held for approval, there may be a delay between the submission of the held user comment and the approval and actual publication of the data item. In a chat or question & answer type live event, such delay may result in confusing and disorderly presentation of the data items to the end user.

In some cases, to maintain continuity and orderly presentation, user-generated data items may be placed in a comment collection and associated with other data items for publication substantially contemporaneously (e.g., in a desired order). In some cases, the comment collection may be modeled as a queue. Accordingly, continuity and ease of reading can be facilitated. However, in other cases, the comment collection need not be ordered by date or time.

At 314, other options associated with the publication object can be configured. Additional options include: a description; a header image; a game id; a language setting; HTML code; event location; time zone; profanity and objectionable language filtering; spam filtering; live language translation; user or Internet Protocol (IP) address filtering; writer and/or commenter e-mail addresses (e.g., for submitting data items directly via e-mail); and Short Message Service (SMS) short codes or phone numbers (e.g., for submitting data items directly via phone).

In some cases, the data collection may comprise one or more external queries. External queries can be search terms or external sources, from which data items can be obtained. Data items may be obtainable, in some cases, only when the data collection is "open". However, in other cases, data items may also be pulled when the data collection is "closed". An external query may specify a search term for use on an external social network, such as Twitter™ or Facebook™. For example, content published on the external website twitter.com containing the desired "hashtag" and published while the data collection is "open" can be retrieved and used as a data item. The external data items may be treated as distinct from writer-generated data items and/or user-generated data items.

Similarly, external queries can be links to a specific external source. For example, an external query may identify a specific user or group on a photo sharing website. Accordingly, content uploaded to the photo sharing website while the data collection is "open" can be retrieved and used as a data item.

As described, dynamic publishing server 210 may provide a list of template objects and publication targets, which may be associated with one or more external sites or subdomains. A user configuring a publication object may elect to associate its data collection with one or more publication targets.

In one example, a publication target may be live.example.com, which can be hosted by storage system 150. The site live.example.com may be affiliated with www.example.com, which may have a standard content presentation style. Accordingly, www.example.com may be used as a template server. In some cases, one or more template pages may be prearranged, as is described herein.

Alternatively, a subdirectory www.example.com/live may be provided for hosting publication objects generated by dynamic publishing server 210. For example, the contents of the "live" directory may be hosted by storage system 150 or CDN 160 and dynamic publishing server 210 may be configured to transmit the required content (e.g., data items associated with a data collection in the publication object) to storage system 150 or CDN 160.

Accordingly, when a search engine indexes content belonging to example.com, the content (including any publication objects) provided at live.example.com will appear as though it is published by the publisher of www.example.com, since both live.example.com and www.example.com belong to the same domain example.com. This may have advantages for content indexing and search engine optimization purposes. When the publication object is published, dynamic publishing server 210 may publish several versions, corresponding to each of the selected publication targets. Accordingly, the publication object may appear to be published in several locations, perhaps by several parties.

Optionally, at 316, invitations to contribute input data to be used in the data collection created at 302 may be generated and transmitted. For example, a list of e-mail addresses may be collected and an e-mail invitation containing login information, a registration link or the like may be sent to the provided e-mail addresses. Recipients of the e-mail invitations can use the provided login information or registration link to access a user interface for submitting input data.

In some cases, predetermined users (e.g., identified by e-mail address, phone number, or other identifiers) may be preconfigured with access to contribute input data to create data items for the data collection created at 302.

Figure 4:
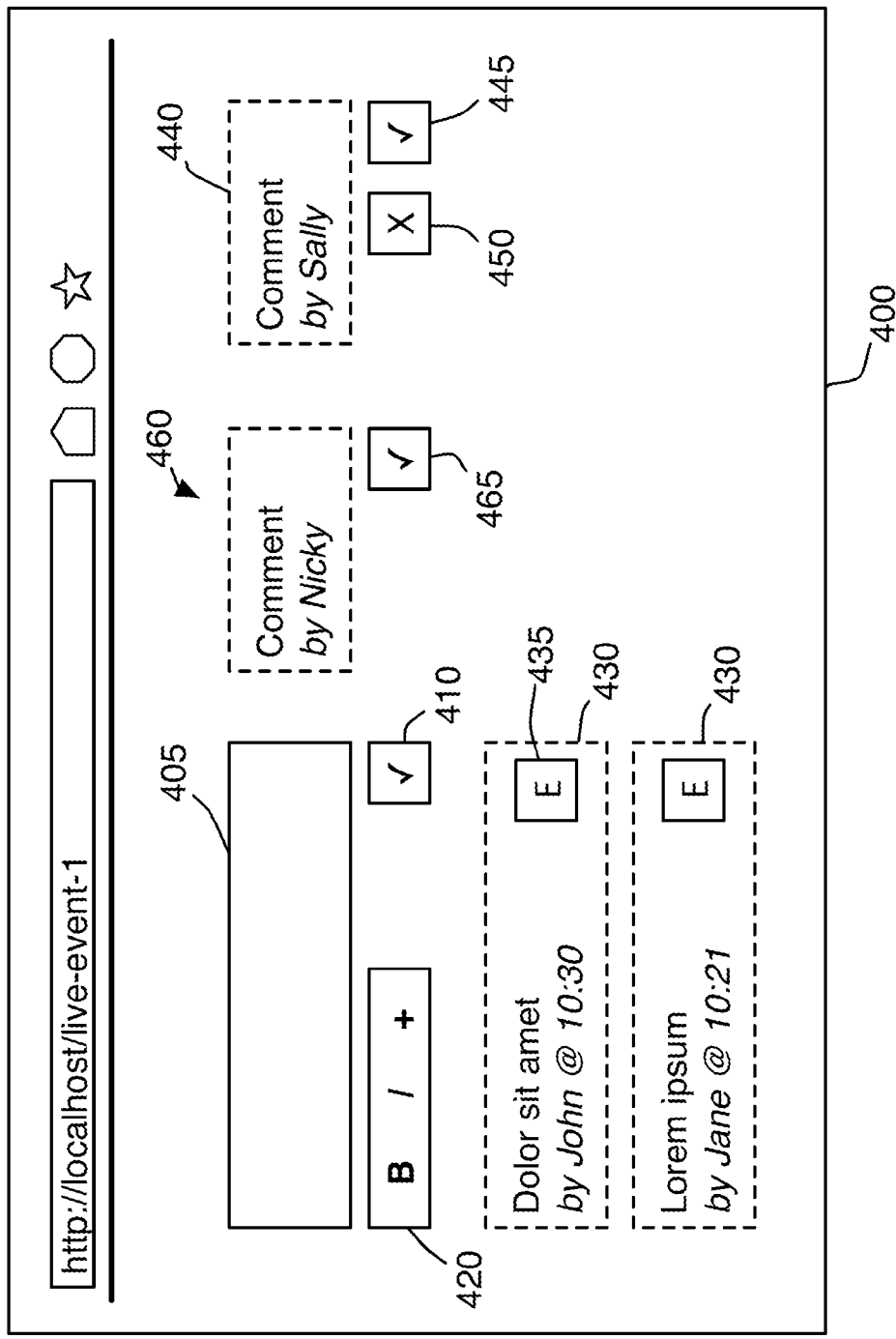
FIG. 4 illustrates an exemplary user interface for submitting input data.

Referring now to FIG. 4, there is shown an exemplary user interface 400 for submitting input data. User interface 400 may be provided, for example, in an HTML document, rendered and provided by a web browser on a client computer.

A content input box 405 may be provided, for enabling a user to enter content as part of the input data to be submitted. A submission button 410 can be used to transmit the input data contained in content input box 405, whereupon the input data can be processed to generate a data item corresponding to the input data. In some cases, the data item may be published immediately and the web browser may be configured to retrieve and display the newly-published data item along with previously published data items 430, as described further herein, for example with reference to FIG. 8.

Previously published data items 430 may also be editable upon selecting an appropriate edit control 435. Further controls (not shown in FIG. 4) may also be provided to otherwise manipulate previously published data items (e.g., delete, "sticky", reply, etc.). In some cases, data items 430 may be directly editable without first selecting an edit control.

If other users are also editing data items and submitting input data in respective user interfaces 400, each of their previously published data items 430 may also be updated in real-time to reflect new data items submitted by other users, as described in U.S. Provisional Application No. 61/449,540, filed Mar. 4, 2011, the entire content of which is hereby incorporated by reference. In general, the display of individual data items 430 may correspond with the view of a data collection that is provided to certain users or administrators depending on their permission level.

Figure 6:
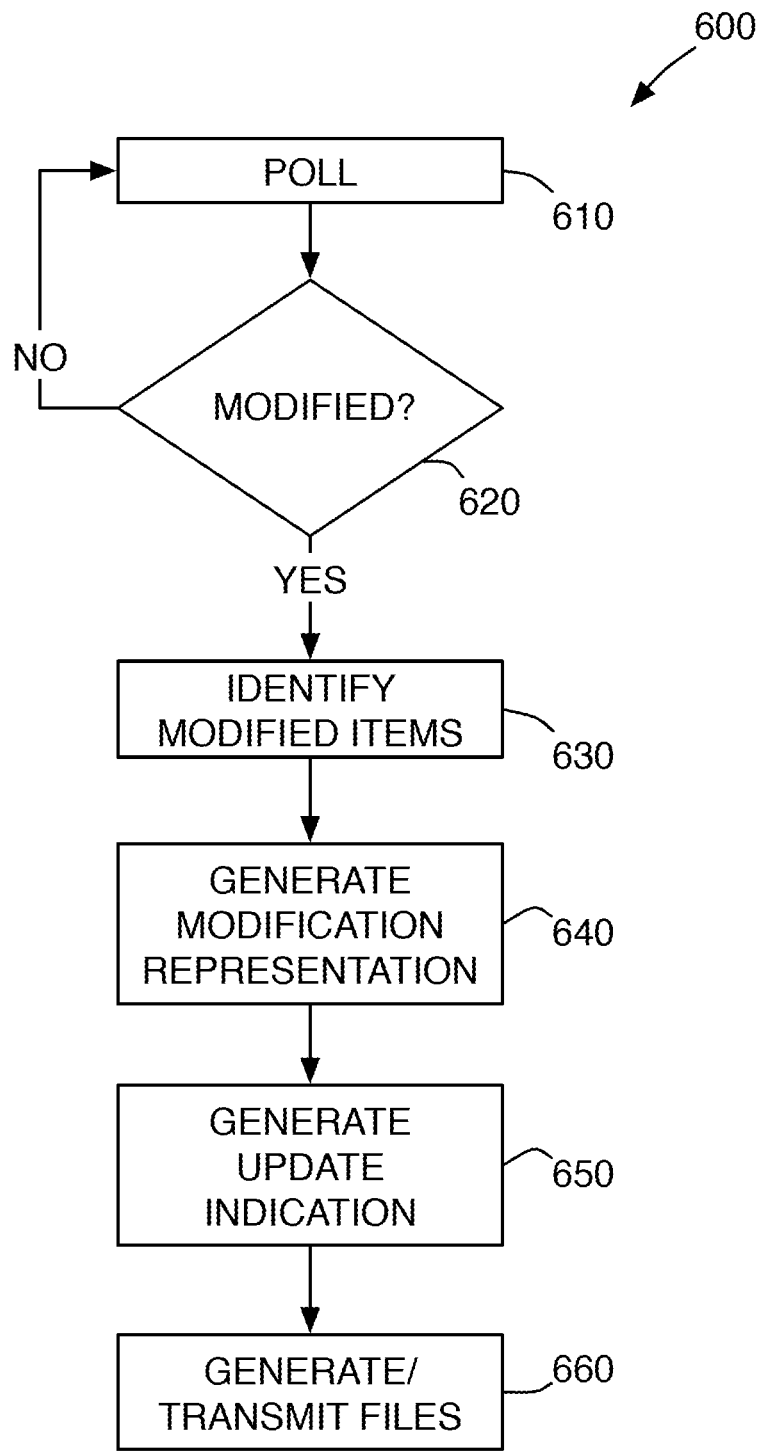
FIG. 6 illustrates an exemplary update process flow.

Data collection updating and synchronization is described in further detail herein, for example with reference to FIG. 6.

Input data and data items may contain multimedia content. Accordingly, controls 420 can be provided to enable access to additional editing and multimedia sharing features. For example, controls 420 may enable formatting entered text (e.g., to alter type face) or uploading multimedia files including images, audio and video to include as part of the data item. A URL control (not shown) may be provided for submitting URLs to incorporate in the data item. In some cases, URLs entered in content input box 405 may be interpreted and the content at the URL (or a representation or variation), which may include interactive or streaming elements such as video, may be retrieved, linked, or referenced for inclusion in the data item.

Various alternative or complementary content input interfaces and features may be employed, such as a dedicated native client software program, an application programming interface (API) and the like.

In some cases, a webcam or audio recording control (not shown) may be provided to facilitate the capture of live video or audio for inclusion in the data item.

If commenting is enabled, comment moderation controls may also be displayed to users with appropriate permissions. Accordingly, comments 440 may be displayed with associated controls to approve 445 or disapprove 450 each comment.

If a comment collection or "queue" is enabled, a collection deck 460 may also be displayed. For example, comments that have been placed on "hold", tagged as spam, or even approved, may be placed in collection deck 460 for later posting by selecting the associated post control 465.

In some cases, collection deck 460 may be used to display the results of an external query or live search. A live search may be an automatic, continuous query or dynamic query of an internal or external source. For example, a live search may be a continuous search of sources identified in external queries. Photos or other content may be continuously or periodically retrieved from the external queries and presented in approval deck 460 for selection and approval. A search box (not shown) may also be provided to augment the external queries with additional searches.

A live search may repeatedly conduct the same query (e.g., "pull" model), or it may comprise an open connection for receiving results (e.g., "push" model).

In some cases, a second collection deck may be provided in parallel with collection deck 460, to display the results of the live search.

Various additional known multimedia content editing and content management features may also be provided, as will be appreciated by those skilled in the art.

Likewise, it will be appreciated that a plurality of users may have access to a user interface 400 for managing and editing the same data items. Different users may have differing degrees of access to manage and edit the data items. For example, some users may be limited to providing input data for new data items, and may be prevented from later editing or deleting data items. Other users may only be enabled to moderate comments. Still other users may have full permission to provide input data for new data items, edit existing data items and moderate comments.

Figure 5:
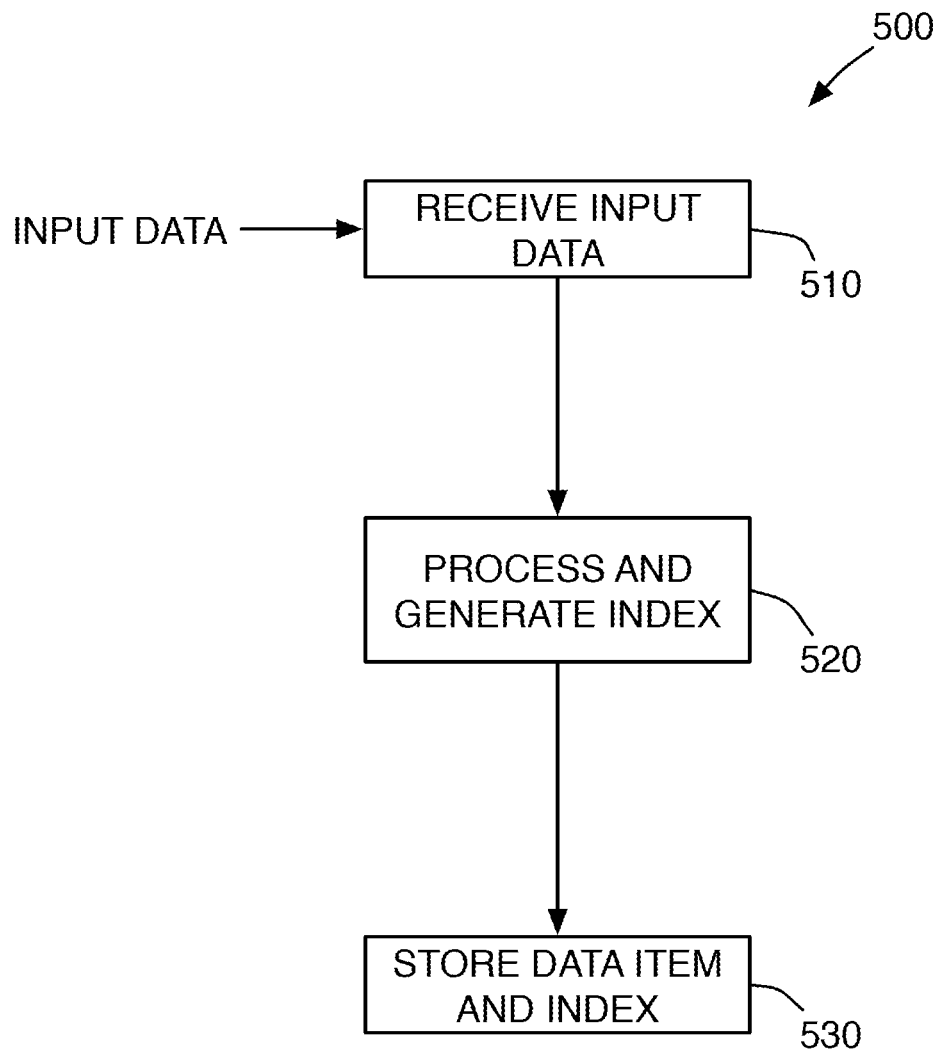
FIG. 5 illustrates an exemplary content input process flow.

Referring now to FIG. 5, there is shown an exemplary content input process flow, which may be carried out by content input module 216. Content input process flow 500 begins by receiving input data. The input data may be entered using an interface, such as interface 400, and associated with a data collection at 510. The input data may be original input data authored by a known user using a writer or client device, input data retrieved from an external query, or a comment received from an end user, a server, etc. The writer device may be a mobile communication device, a desktop or laptop computer, or other suitable computing device. The input data can be associated with a particular data collection (e.g., according to the URL, ID, etc.) used to submit the input data. In particular, the submission URL may contain a unique identifier associated with the data collection. Alternatively, content input module 216 may associate the input data with the data collection if the input data was retrieved by dynamic publishing server 210 using an external query.

The input data may be processed at 520 by content input module 216 to generate a data item for storage in database 212. For example, content input module 216 may sanitize text, recompress images, generate icon or thumbnail representations of links or images, and the like.

Content input module 216 may also generate or update a content index for identifying the data item. The content index may be an incrementally-numbered index value, a character string, a timestamp or any other suitable index value, as described herein. In some cases, the content index may be managed as described in as described in U.S. Provisional Application No. 61/449,540, filed Mar. 4, 2011, the entire content of which is incorporated by reference herein.

Once the content index has been generated or updated, the data item and content index are stored in database 212 in association with the data collection.

Referring now to FIG. 6, there is shown an exemplary update process flow, which may be carried out by content management module 220. Update process flow 600 may be performed asynchronously from the generation of data items and publishing of the data items. In particular, process flow 600 may be performed periodically at predetermined intervals, for example by dynamic publishing server 210. In some cases, process flow 600 may be performed substantially continuously.

This update process flow may occur for example when content publishing system 100 updates a modifiable data collections using data collection and data items from other publication objects, and publishes the modified data collection as a new or updated publication object. As described herein content publishing system 100 enables existing data collections and data items from publication objects to be copied and added to other data collections in order to be reuse, retailor, repurpose, and modify existing data collections and data items. In some embodiments, the copied data collection and the original data collection may be treated as separate data collections. The update process described in FIG. 6 is an example only and other techniques may be used for updates to the modifiable data collection. For example, FIG. 6 describes a technique based on polling a database, but others ways to provide updates may be used, such as a technique based on pushing data from a database. For example, another technique may involve holding a socket open which connects a client device to a server (in turn connected to a database) and the server may send modifications as they occur through the socket. As a further example, a browser on a client device may send a request to a server, where the request stays open until the action (i.e. modification) occurs. These are examples only and other polling or pushing techniques may be used.

Content management module 220 may maintain a record of the current state of each data item associated with one or more data collections. Accordingly, process flow 600 may be performed independently for each data collection managed by dynamic publishing server 210. There may be more than one content management module 220 operating on each dynamic publishing server 210, each associated with one or more data collections.

At 610, content management module 220 may query a content database, such as database 212 to determine if data items associated with a particular data collection have been modified since the last query was performed. The query may be implemented as a polling technique. Alternatively, when a modification occurs then the content management module 220 may be notified based on a pushing technique. Modifications may comprise the addition, deletion or change (e.g., editing) of a data item. If there are no modifications to the data items, content management module 220 may take no other action and wait a predetermined period before another query is generated.

If modifications to the one or more data items have occurred, content management module 220 identifies the modified data items at 630, and generates or regenerates a modification representation associated with the data collection at 640. In some cases, the modification representation may be a delta or "diff" identifying changes relative to a previous version. In other cases, the modification representation may comprise the entirety or a substantial portion of the added, deleted or changed data items. In general, the modification representation is a data structure suitable for instructing a device with a previous version of the data collection to update its local version of the data items to a current state or representation. The modification representation may include an index associated with the modified data. The index enables client devices to efficiently locate previous versions of the data that need to be updated.

In some embodiments, the modification representation may be provided as a data item comprising executable instructions (e.g., JavaScript) to update one or more other data items in the relevant data collection.

In some other embodiments, the modification representation may be provided as a replacement data collection.

Any additions, changes or deletions in the data collection may be marked-up or highlighted, as desired.

Content management module 220 may also generate an update indication, which can be used to notify client devices that modifications have occurred. The update indication may be a unique identifier, such as a timestamp. In some cases, the update indication may comprise the modification representation itself. As noted, an update may involve an addition, deletion, change, resize, reformat, reorder, and so on.

At 660, content management module 220 generates one or more files corresponding to the update indication and/or the modification representation. The files can be published to a publication server, such as storage system 150 or CDN 160. In particular, the files associated with a particular data collection can be published at the one or more publication targets that are associated with the data collection and its corresponding publication object.

The modification representation files may be formatted, for example, according to the JavaScript Object Notation (JSON) data interchange format, although other suitable formats (e.g., XML) may also be used.

To generate a complete copy of a data collection at a client device, the data items can be retrieved and assembled in a desired order. In some cases, the publication object may also comprise one or more code objects for assembling and encapsulating the data collection. For example, a code object may be an HTML web page comprising JavaScript code for retrieving the one or more data items associated with a data collection, and periodically retrieving modification representations to update the data collection. The code object may be generated using a template object and thus be formatted in a style corresponding to the template object. In one example, the code object may comprise HTML and JavaScript configured to employ JSONP (JSON with padding) when retrieving data item and modification representation files, although other suitable approaches may also be used.

In some cases, files associated with a publication object can be stored on a storage system and a proxy server may be used in combination with AJAX techniques to deliver content to end users. The proxy server may be, in some cases, a server associated with the external publisher. Accordingly, it may be necessary to account for some cross-domain limitations associated with JavaScript or Flash.

Separation of functionality between content input module 216 and content management module 220 can serve to de-link the input process from the publishing or transmitting process, thus allowing for scalable delivery and facilitating backup and failover methods.

For example, content input module 216 can store newly added data items or modification representation files in two or more redundant databases 212, with a first primary database and one or more secondary, failover databases. In the event that a database fails, dynamic publishing server 210 can substantially immediately switch to a failover database without loss of database consistency or interruption of service. Once the failed database is restored, it can be synchronized with an in-service database and brought back into service.

Similarly, by transmitting files to storage system 150 or CDN 160, which can have multiple redundancy built-in, content management module 220 can ensure that no interruptions in service occur in the event of a hardware or network failure.

In many cases, it may be desirable for a content provider to generate and manage content, such as a data collection comprising data items, and also to have the data collection be available for publication and dissemination via multiple publication targets.

In some cases, the provider of the data collection may wish to add, change, delete or otherwise modify the data items that form the data collection, even after the data collection has been published. For example, if the data collection relates to a live event (e.g., an ongoing news story), there may be a need to update the data collection with new data items, or modify existing data items on an ongoing basis.

Individually updating a large number of publication targets would, in many cases, be unwieldy and inconvenient. However, by using data collections, a content provider can continue to add, change or delete data items without the need to individually update multiple publication objects.

As one example, there may be a live blog dedicated to a particular news topic. A live blog can be a publication object (e.g., a web page) that automatically provides updated content in real-time as new entries are generated or posted. The updates may be done seamlessly from the client perspective, such that the user may not be required to manually refresh the web page to see the updated content. The live blog may publish a publication object associated with a data collection, where the data collection comprises data items generated by the live blog writer or provider.

Figure 11:
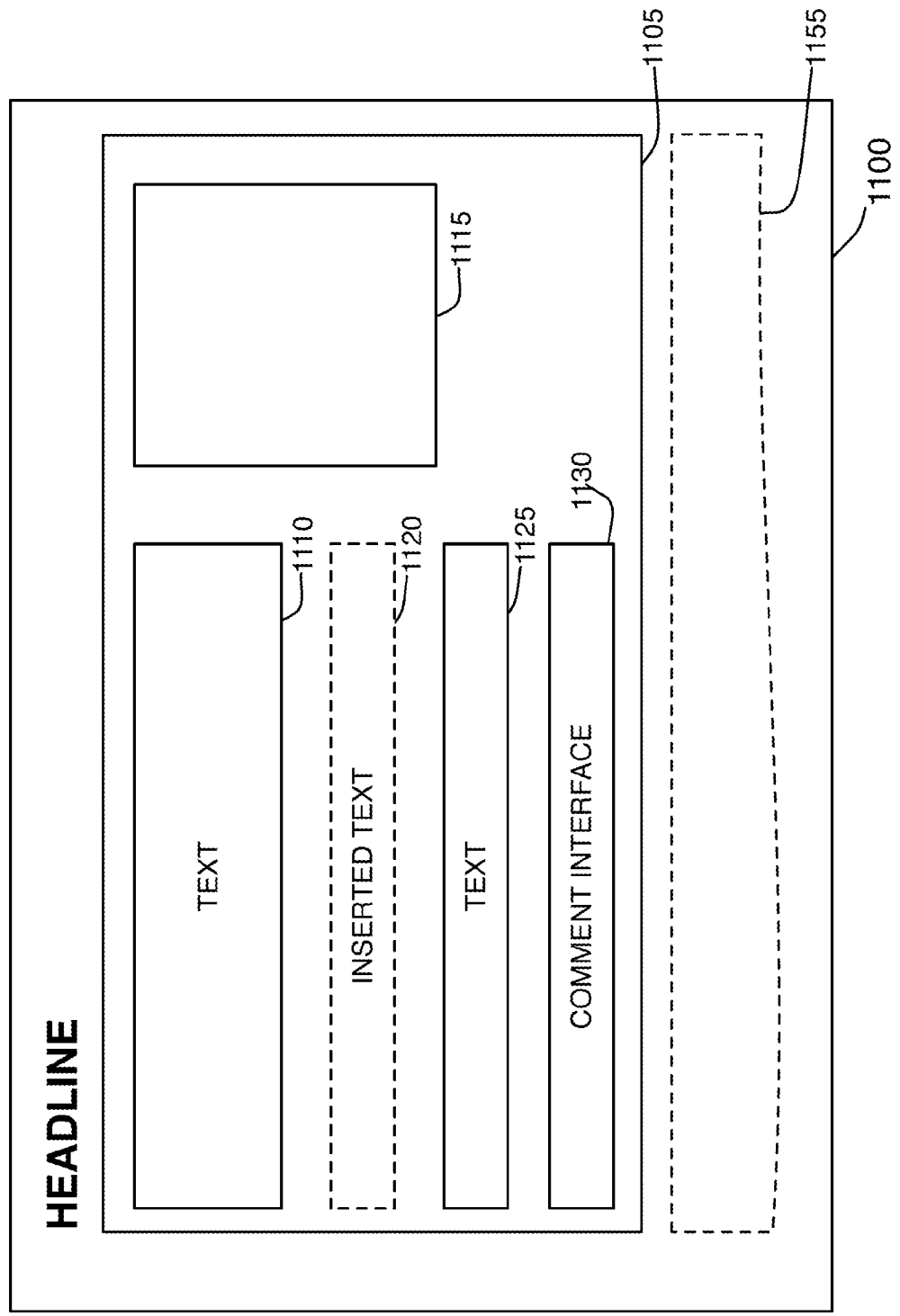
FIG. 11 illustrates yet another exemplary publication object.

A live blog may be contrasted with an article with real-time updates, described herein with reference to FIG. 11.

In some cases, the live blog provider may wish to augment the data collection with additional data collections or data items. For example, the data collection may comprise live updates regarding an unfolding news story.

Figure 7:
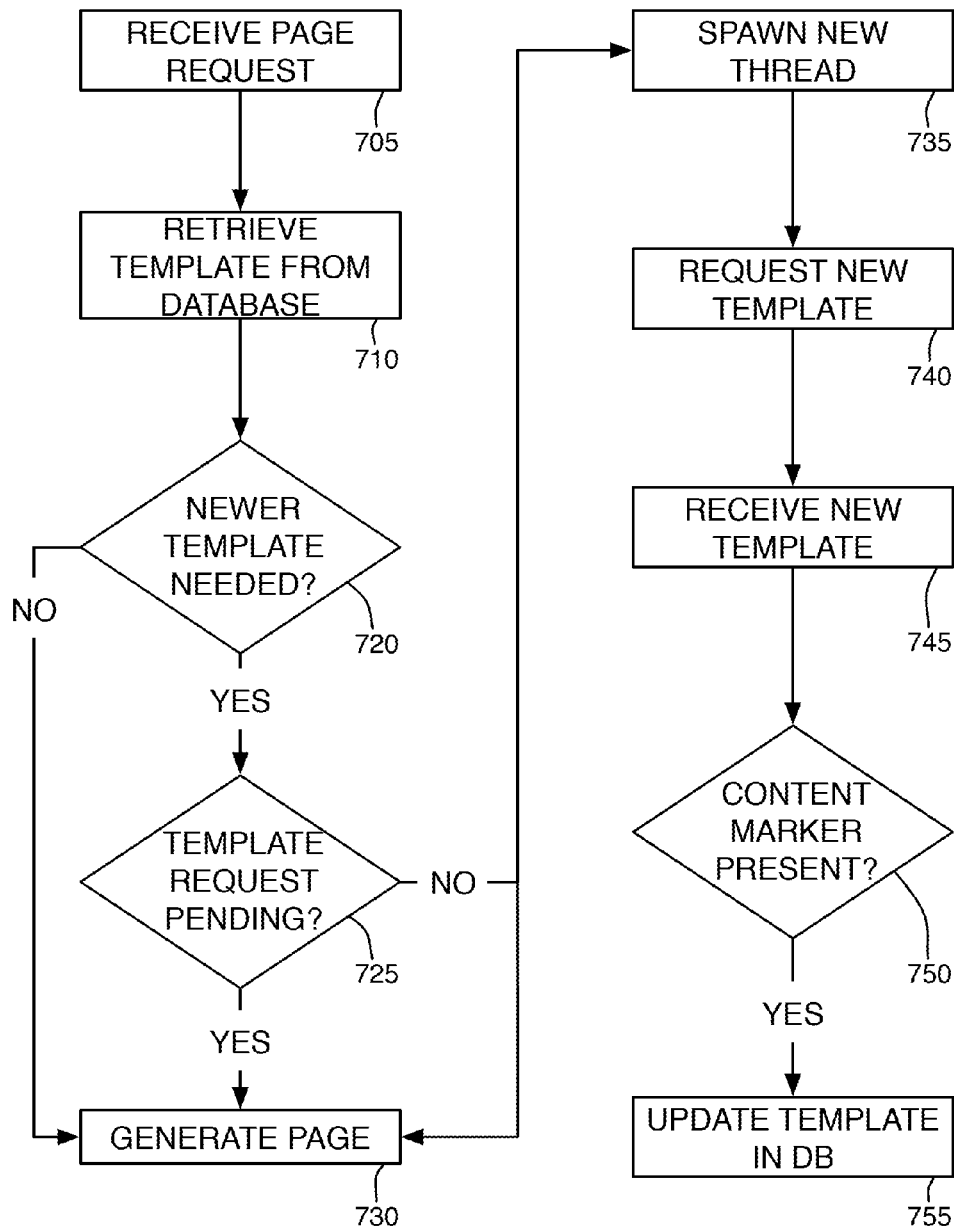
FIG. 7 illustrates an exemplary template generation process flow.

Referring now to FIG. 7, there is shown an exemplary template generation process flow, which may be carried out by template module 218. The template generation process flow may be carried out with each page request, at predetermined intervals, manually upon request by an administrator, or omitted entirely.

At 705, a page request for a code object associated with a publication object is received. For example, the page request may be passed back by CDN 160 in response to an end user client request. In some cases, the request may originate directly from an end user or from a local server or process.

At 710, template module 218 retrieves one or more template objects associated with the requested publication object from database 212. Generating the page with the available template object ensures that the requested code object can be delivered without any delays imposed by the template retrieval and re-generation process.

Once the page has been generated, template module 218 may determine if a newer template object should be retrieved or generated at 720. For example, template module 218 may examine a timestamp or expiry time associated with the retrieved template object.

If it is determined that a newer template object should be retrieved, template module may, optionally, spawn a template retrieval thread at 735. The decision to spawn a new thread may depend on whether an existing template request is pending, which can be determined at 725. Alternatively, template module can continue the original thread.

If a template retrieval thread has been spawned at 735, template module 740 can request a new template object (e.g., page) from a template server, such as a third party website. The template page provided by the template server may be a preconfigured "dummy" page hosted by the third party website, which may contain headers, footers, layout information and other ancillary content. In some cases, the provided template page may contain a placeholder or content marker indicating where a publication object (e.g., comprising data items in a data collection) can be inserted. In some cases, the provided template page may not contain any primary content. The content marker may be a predetermined text marker (e.g., "—INSERT CONTENT HERE—"), a token or a preconfigured HTML tag, ID or class. In still other cases, the provided template page may contain existing content that can be discarded.

At 745, the template page may be received and template module 218 may determine if a content marker is present in the template page at 750. If a content marker is present, the template page may be used to update the current template object to use the new template object, and stored in database 212, at 755. In some cases, template module 218 may discard the received template page, for example, if an error has occurred.

In some cases, such as when a preconfigured template page is not provided by the template source, a template object may need to be manually generated or edited by an administrator. In such cases, template module 218 may reschedule template retrieval for a later time. Optionally, template module 218 may generate and transmit a message to an administrator that manual intervention is required, either to identify a content marker or to otherwise prepare the template object.

Template generation process 700 may also be performed periodically at predetermined intervals or on-demand based on some other event, such as a manual template update request.

Figure 8:
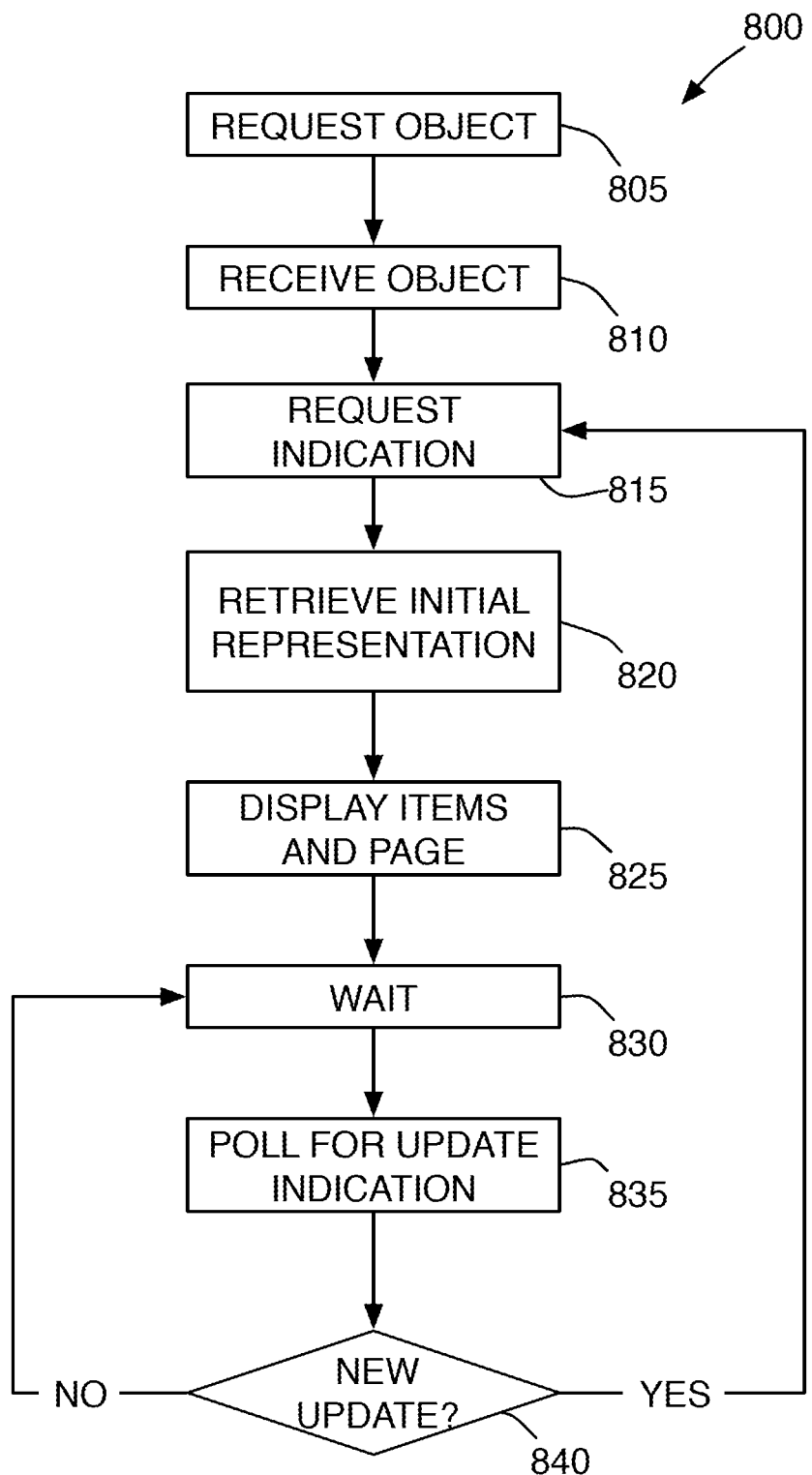
FIG. 8 illustrates an exemplary display process flow.

Referring now to FIG. 8, there is shown an exemplary display process flow, which may be carried out by a client device to display a publication object and its associated data collection. The client device may be a mobile communication device, a desktop or laptop computer, or other suitable computing device. In particular, display process 800 may be performed by a client program, such as a web browser or other program code, such as a mobile device application.

At 805, the client program requests the publication object from a publication server, such as dynamic publishing server 210, storage system 150 or CDN 160. A response to the initial request may return simply a code object associated with the publication object at 810.

Once the code object has been received, the client may begin rendering the presentation display.

As noted, the code object may be an HTML document, which can contain or reference program code for assembling one or more data items associated with the data collection of the publication object.

When the client program first requests the publication object, a selection of data items associated with its data collection may be sent. The selection of the data items that is sent may be considered an initial representation of the data items. For example, the initial representation may simply comprise the current form of all data items associated with the data collection. In some cases, the initial representation may comprise all data items dated within a recent interval period (e.g., all data items received or generated in the past 30 minutes). Likewise, the initial representation may be paginated, with only more recent data items appearing directly in the initial representation, whereas older data items may be linked or may be revealed progressively as a user scrolls through a list of data items.

At 815, the client may request an indication of when the most recent update or modification to the data collection occurred. The indication may be a unique identifier, which can be sequentially numbered so that the client device can determine when an update has occurred. For example, the indication may comprise a timestamp identifying the time of the last update.

At 820, the client requests the initial representation of the data collection. Generally, the initial representation will contain up-to-date data items. Accordingly, the initial indication may be used simply as a reference so that later updates can be identified.

Once data items associated with the data collection begin to be received, the client may, at 825, render the data items in the presentation or output display in the appropriate order.

If the data collection is a live event or is being updated, the code object may indicate that the client should periodically poll for an update indication. Accordingly, at 830, the client may be instructed to wait a predetermined interval. Upon expiry of the interval, the client may request the update indication again at 835.

The client may determine if an update indication exists at 840. If an update indication exists, the client may return to 815 to request a modification representation. If there is no update indication (e.g., because the data collection has not been updated), the client may return to 830 to wait the predetermined interval before attempting to request an update indication again.

In some cases, certain steps of display process 800 may be omitted. For example, if a request is made through an API, display step 825 may be omitted.

Thus to generate the presentation display containing the data collection and its respective data items, the client retrieves a code object, an indication and one or more corresponding data item files. The client also periodically polls for an update indication. If an update indication exists, the client can retrieve a modification representation to generate, at the client, a current representation of the data collection.

In some cases, each modification representation may represent all additions, deletions and changes since the last update indication was generated. However, in other cases, each modification representation may represent only those additions, deletions and changes that have occurred within a recent predetermined time interval. Accordingly, the current representation of the data collection that is maintained at a client device may not fully reflect the actual data collection maintained by dynamic publishing server 210. This may be an acceptable trade-off in some cases, such as a fast-changing live event.

Providing a large number of data items in an output display may be unwieldy and inefficient. Accordingly, in some cases, it may be desirable to limit the number of data items that are displayed at once. For example, the data collection may be paginated or subdivided into groups or "pages" of a predetermined size. Each of the groups or pages may have a URL associated with it, which when selected can result in the retrieval of the relevant group of data items.

Pagination may be displayed in a different manner, depending on the state or type of publication object. For example, links to the groups of data items may be displayed in reverse chronological order when the publication object is live and displayed in forward chronological order when the publication object is not live.

In general, the number of data items in a group can be kept within a predetermined limit of data items. However, in some cases a hard limit may not be desirable. For example, if a most recent group of data items exceeds the predetermined limit, it may not be desirable to perform pagination immediately, as this may result in a group with very few data items, which would provide little context for an end user. Accordingly, pagination may be delayed in some cases until the number of data items displayed in the current representation exceeds the predetermined limit of data items by a predetermined threshold (e.g., 20%).

Use of the client in this manner relieves dynamic publishing server 210, storage system 150 and CDN 160 of the additional burden of regenerating a complete page for each new data item that is added, deleted or changed in the data collection. Each added, deleted or changed data item requires only a small amount of resources to provide, as it requires only small, static files to be used (e.g., the update indication and the modification representation), which can be cached and made available at a common location (e.g., URL) so that all watchers can poll the common location periodically. Likewise, a "push" notification is not necessary, as the client is instructed to periodically determine if there is new content to be retrieved.

There may be a relatively small increase in bandwidth relative to a push-based system, due to client requests for new content index files. However, this relatively small burden can be easily handled by CDN 160 or storage system 150 and provides the benefit of significantly reducing resource requirements for dynamic publishing server 210 and even storage system 150 (where CDN 160 is used).

For the purposes of illustration, a number of exemplary uses of the described embodiments will now be provided.

In some cases, it may be desirable for the publisher of an online publication, such as a live blog, to be able to provide content in real-time, while maintaining the ability to scale to a large number of clients. The live blog may provide a collection of real-time live blog entries, which may be in the form of text, images, audio or video. Accordingly, each entry may be a data item, in a data collection created for the live blog.

In order to scalably publish and update the live blog, the live blog entries (e.g., data items) may be entered into a database and associated with a data collection of the live blog.

The database may be periodically polled by a content management module, to identify at least one modification of the live blog entries, including additions, changes or deletions of the entries in the live blog.

If a modification of one or more live blog entries is identified, the content management module can generate and store a modification representation of the changes. The modification representation may be information that can be used to reproduce changes to the live blog entries based on a previous version. In addition to the modification representation, the content management module may also generate an indication of the changes, which may be a file with a timestamp, signifying the last known update to the live blog.

Each of the live blog entries, the modification representations and the indications can be published on a storage system, such as Amazon S3. A CDN may be also be used to distribute the content stored on the storage system.

Accordingly, a client can receive content directly from the CDN (or in some cases from the storage system) without directly communicating with the live blog publishing server, although this may be permitted in some cases.

From the client perspective, the client may receive an initial representation of the live blog, comprising each of the live blog entries to date. If there are a large number of live blog entries, the client may receive only a number of most recent entries, with the remainder being "paginated". In particular, pagination may allow older entries to be retrieved when a user clicks a link, or scrolls beyond a predetermined point, alleviating the need for the client to retrieve all entries in the live blog initially.

The client can display the initial representation, comprising the live blog entries. The client may also be configured, based on code embedded in the live blog, to periodically request an update indication, such as the indication generated by the publishing server. If the update indication is available, and indicates that the live blog has changed such that the client's version is no longer up-to-date, the client may request the modification representation currently available. Based on the modification representation, the client may update its own initial representation (or subsequent representations created with previous modification representations). Accordingly, the representation of the live blog at the client can be updated in real-time. It will be appreciated that the client need not interact directly with the publishing server. The publishing server can publish files to a storage system and/or CDN. Conversely, the client need only interact with the CDN and/or storage system. In some cases, the client may be able to communicate directly with the publishing server.

In some cases, a content provider may wish to provide a consistent presentation style, or to adopt the presentation style of a third-party. For this purpose, templates may be used. It may be desirable for the templates to be periodically updated, to ensure that content generated by publishing server is provided in a current presentation style.

For example, a live blog for a news organization may be presented using a template associated with the main website of the news organization. The news organization may periodically, even frequently, update the presentation of the main website. Accordingly, the live blog template may need to be updated periodically to reflect these changes.

When publishing the live blog, a template module may determine if a current template exists. If the current template exists, the live blog may be published using the current template. In some cases, an expiry time of the current template may be checked, and if it is determined that the current template should be updated, a template update process can be initiated. In some other cases, there may be an offline process to perform the template update process.

If the template update process is initiated, it may comprise retrieving a predetermined page from the main website of the news organization. The predetermined page may be a "dummy" page, with a content placeholder or an empty area of the page reserved for the live blog content. In some cases, the "dummy page" may be a regular content page. Accordingly, in some cases, it may be necessary for an administrator to manually edit the "dummy" page to generate the updated template.

Figure 9:
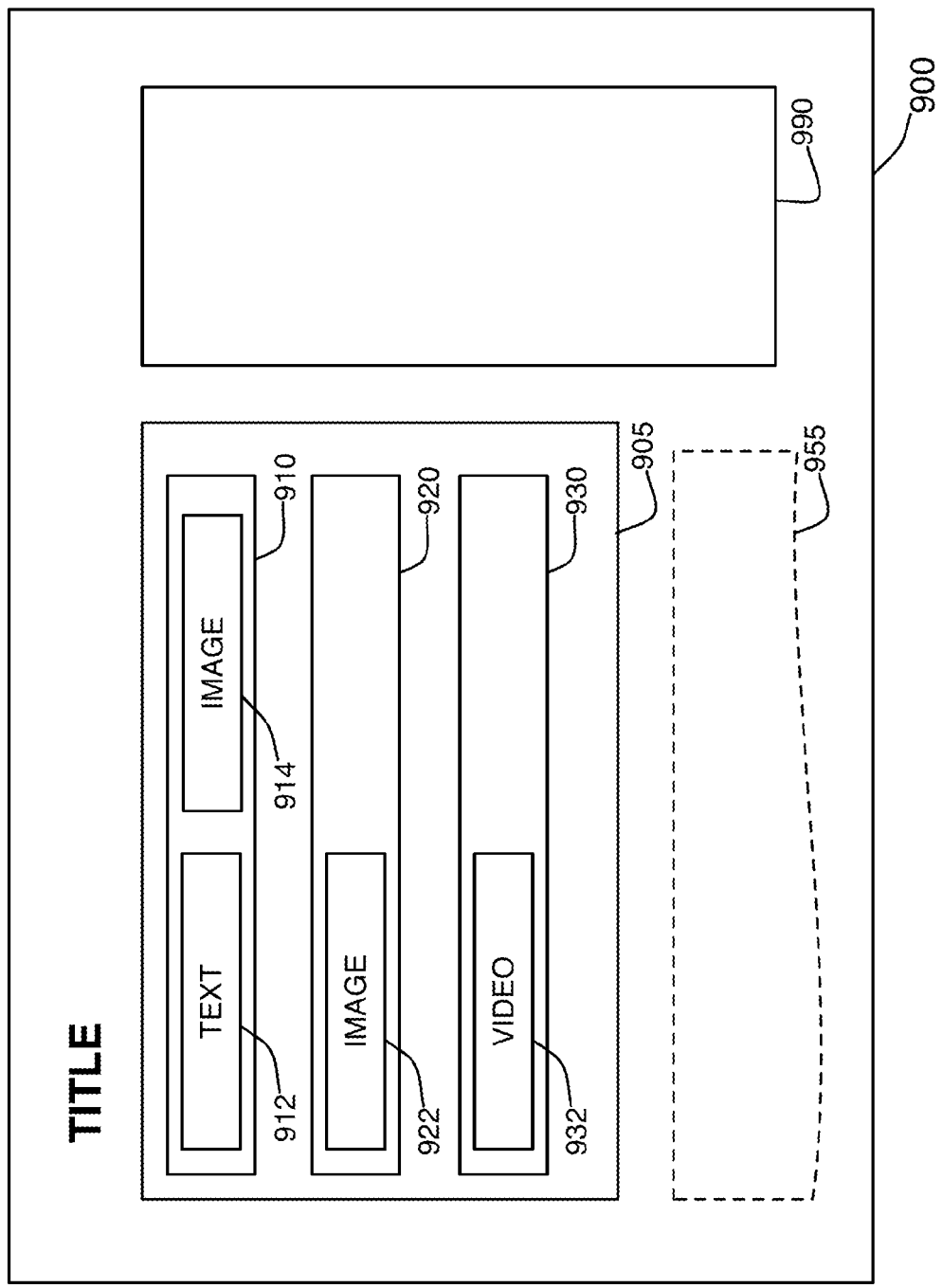
FIG. 9 illustrates an exemplary publication object.

Referring now to FIG. 9, there is shown an exemplary publication object 900.

Publication object 900 may be a web page comprising a data collection 905 and other content 990. Other content 990 may be a navigation menu, advertisements, static content or any other suitable content.

As shown, publication object 900 comprises a data collection 905. Data collection 905 comprises data items 910, 920 and 930. Data item 910 comprises text content 912 and image content 914. Similarly, data item 920 comprises image content 922, and data item 930 comprises video content 932. Although not shown, data collection 905 could also comprise data items, for example, with audio content or computer-executable instructions. The computer-executable instructions may not be visible when the publication object 900 is displayed by a client.

As described herein, in the context of dynamic content, the data items 910, 920 and 930 in data collection 905 may be modified in real time. In particular, new data items may be added, and the existing data items in the data collection may be changed or deleted.

In one example, data collection 905 may be a block of HTML content, for example enclosed in a DIV tag. Data items 910, 920 and 930 may be identified with indices, tokens, tags or other suitable identifiers, as described herein.

Optionally, there may be one or more additional data collections 955. In some cases, the additional data collections may be displayed separately. In some other cases, the additional data collections may be integrated with data collection 905.

Figure 10:
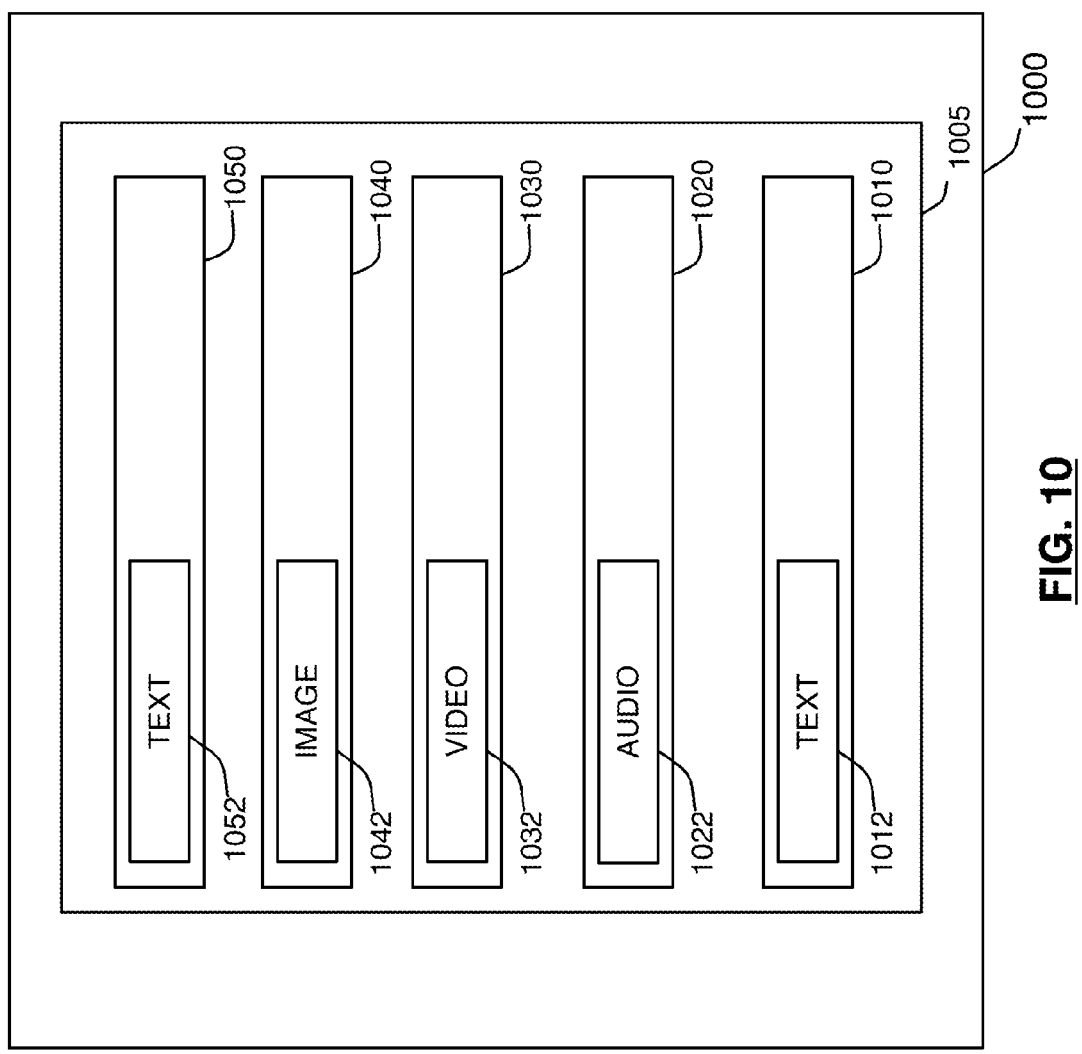
FIG. 10 illustrates another exemplary publication object.

Referring now to FIG. 10, there is shown an exemplary live blog publication object comprising data collection 1005.

Data item 1010 comprises a text item 1012 written by a writer. Data item 1020 comprises an audio comment 1022, which may be automatically generated, for example, based on data received from a VOIP interface. Data item 1030 comprises a video 1032. Data item 1040 comprises an image 1042 posted by the writer of the live blog. Data item 1050 may comprise a user comment 1052 posted to the live blog using a comment entry form (not shown). The user comment may appear in the live blog stream immediately upon submission. Alternatively, the user comment may be held for moderation as described herein.

In the exemplary embodiment, each of data items 1010 to 1050 may be separate live blog posts. For example, each of the data items may have a date or timestamp associated therewith. However, in some cases, some or all of the data items 1010 to 1050 may appear to be part of the same live blog post.

The live blog publication object may contain data collections and data objects that may be copied and added to create or update other data collections. Similarly, the live blog publication may contain a data collection that was created or updated using copied data collections or data items from other publication objects. This enables data collection and data items to be reused, modified, repurposed, retailored in different data collections.

Referring now to FIG. 11, there is shown an exemplary publication object comprising an article portion and a live blog portion. The article portion may be an article with real-time updates, as described in U.S. Provisional Application No. 61/449,540, filed Mar. 4, 2011, the entire content of which is hereby incorporated by reference.

Publication object 1100 comprises a first data collection 1105 and a second data collection 1155. In some embodiments, the first data collection 1105 may comprise the second data collection 1155, or vice versa. The data collections 1105, 1155 may contain data collections and data objects that may be copied and added to create or update other data collections. Similarly, the data collections 1105, 1155 may have been created or updated using copied data collections or data items from other publication objects.

First data collection comprises data items including text blocks 1110 and 1130, an inserted text block 1120 and a user comment interface 1130. First data collection also comprises an image data collection 1115.

Text blocks 1110, 1120 and 1130 may be, for example, HTML content comprising text content and appropriate mark-up tags.

Image data collection 1115 may be a data collection that comprises an image data item and a caption data item.

Each data item in first data collection may be modified, added or deleted in real-time as described herein. In particular, inserted text block 1120 may be a data item that is added to the first data collection 1105 in real-time.

Second data collection 1155 may be a data collection for a live blog, similar to data collection 1005.

Each data collection and data item may be associated with a set of attributes. An attribute defines a property of the data collection or data item, and a given instance of such property. That is, the set of attributes define metadata for the data collection or data item. An attribute may include a name and a value pair. For example, a name may be "creator" and the value may identify the creator name for that specific data item. An attribute may also define a data type or class for the data collection or data item. The set of attributes may include different types of attributes for each data collection, or data item, or the set of attributes may be a standard set of attributes for all data collections and data items. The set of attributes may be modified to include additional attributes and delete attributes. The values of attributes may also be modified. The set of attributes may be defined by a data structure of name/value pairs. Examples of attributes include: creator name, last modified date/time, permissions, source identifier(s), destination identifier(s), creation date/time, copyright, owner, organization responsible, color, style, encoding rate, location, publication location identifiers, index, link, dimensions, font, data type, and so on.

Figure 12A:
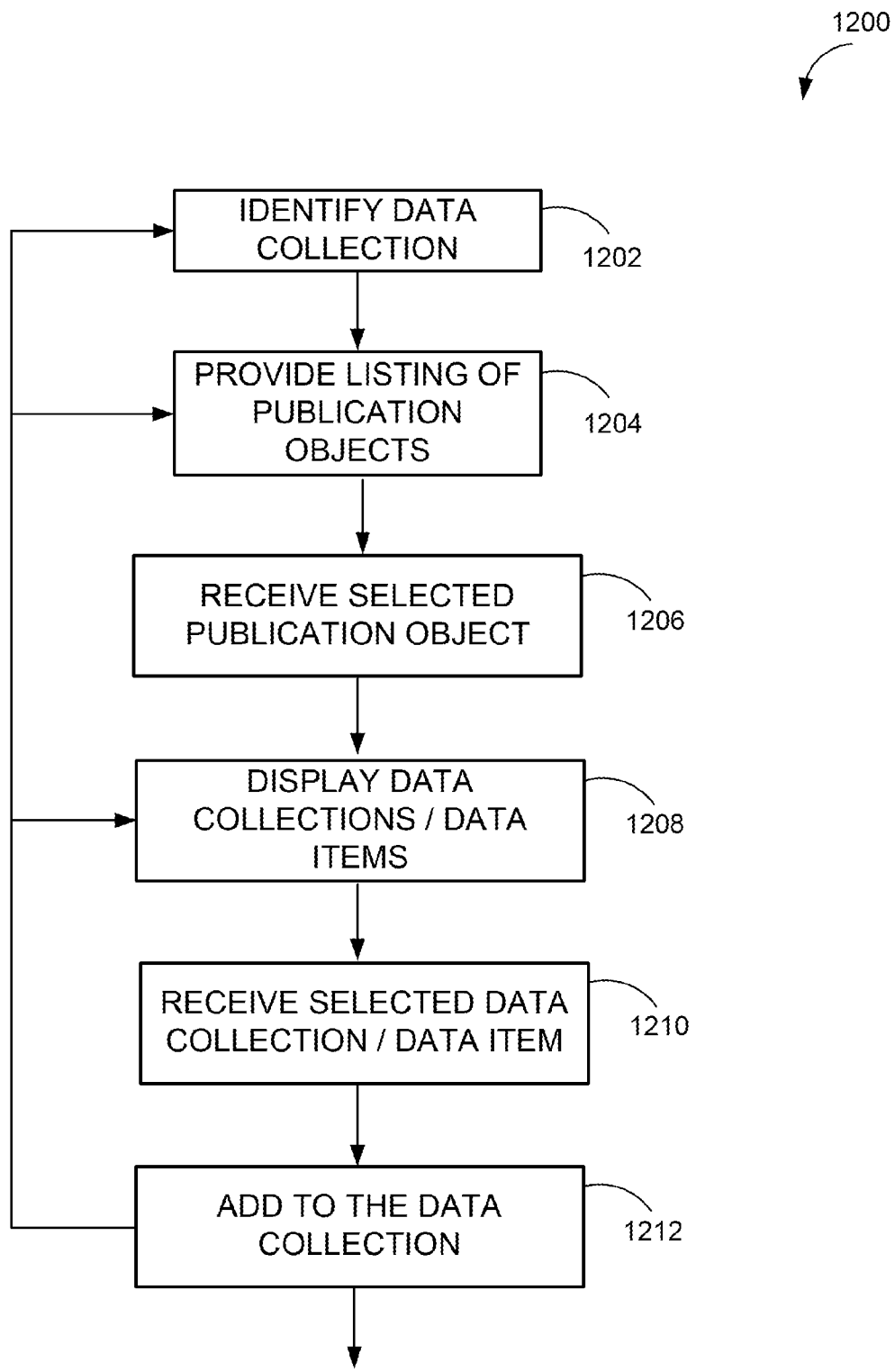
FIGS. 12A and 12B illustrate process flow diagrams for an exemplary publication object.
Figure 12B:
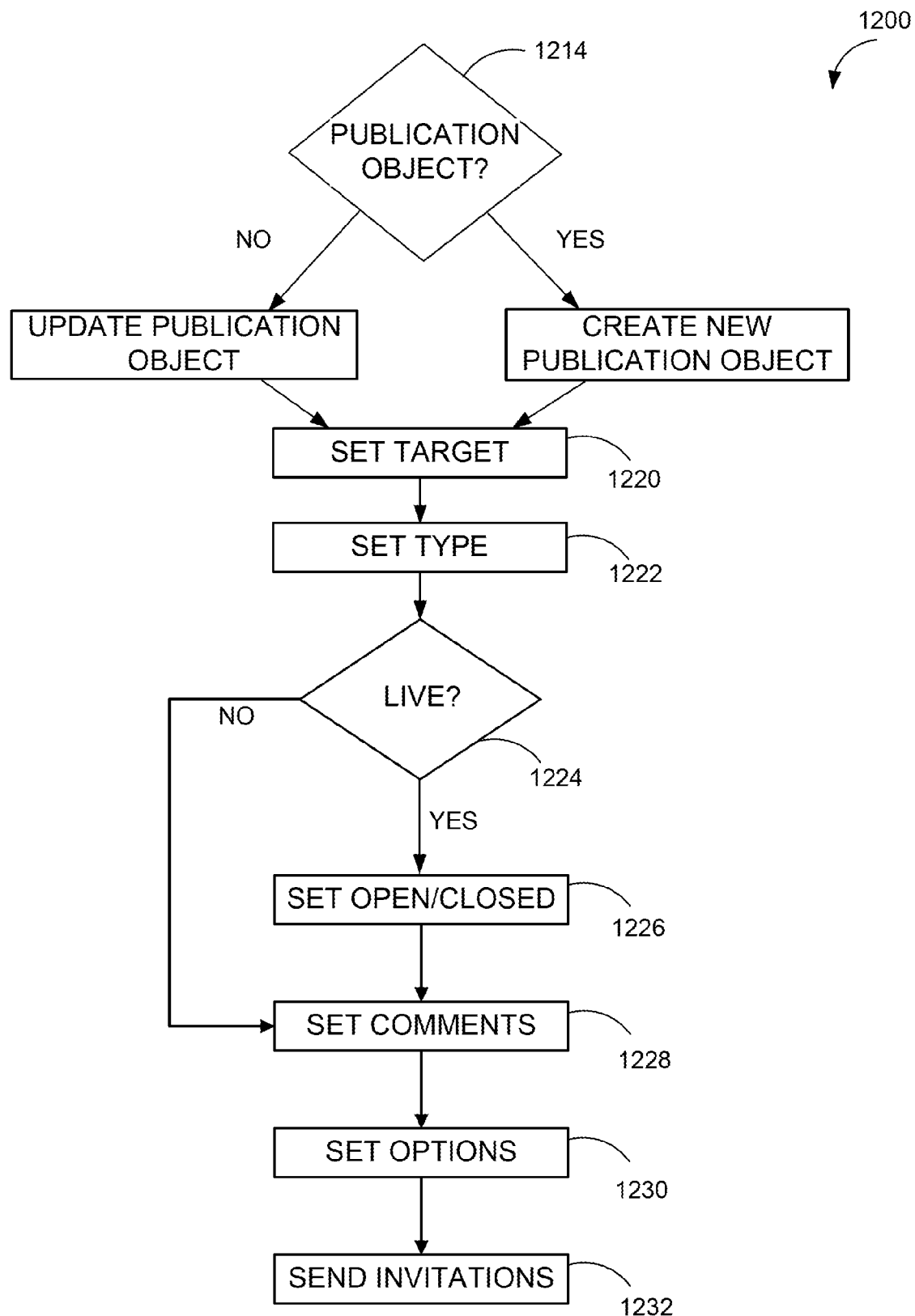

Referring now to FIGS. 12A and 12B (which may collectively be referred to as FIG. 12), there is shown a diagram of a process 1200 for modifying and publishing a data collection as a publication object, in accordance with embodiments described herein. The process 1200 may be performed by content publishing system 100, and in particular, publication module 222 of the publishing server 210 connected to the CDN 160 having access to a database maintained by the content management module 220. Each publication object can have one or more associated data collections. For example, the publication object may have an article portion with real-time updates, a live blog portion, and so on. The associated data collections may include articles with real-time updates, articles, live blogs, live blog entries, data feeds, content from social networking systems, and so on. Each data collection is associated with data items, such as images, video, text, and so on. The data collection may also be associated other data collections. Each data collection and data item may also be associated with a set of attributes defining metadata for the data collection or data item.

At 1202, content publishing system 100 identifies a modifiable data collection, which is a data collection capable of being modified, edited, or updated. In some examples, the identified modifiable data collection will be a new data collection, and at 1202 a new data collection may be created and stored in the database. The new data collection may be created using various mechanisms. For example, the data collection may be created by generating a new data collection entry in a database, such as database 212. However, in some cases, a data collection need not be created in the database. For example, the data collection may comprise one or more rules for identifying associated content such as social network posts containing one or more query terms, posts from the same geographic area (e.g., based on geographically-identifying data associated with the post), and posts in the same language.

Content publishing system 100 may create a new data collection that is empty and contains no content. Content publishing system 100 may also create a new data collection that already contains content, such as one or more other data collections and data items. Content publishing system 100 is operable to efficiently add data collections and data items to the new data collection from other publication objects. The added data collections and data items may be newly created, such as when a user submits new text, new images, and new videos. The added data collections and data items may also be reused or repurposed from other publication objects, as will be explained herein. Reusing and repurposing data collections and data items may be efficient as a user does not have to have to start from scratch by recreating all content in order to modify data collection. A user may efficiently update a modifiable data collection by reusing content (data collections or data items) from other publication objects, such as video, text, images, and so on. When a modifiable data collection is modified by adding data collections or data items from other publications objects, the set of attributes associated with the reused data collections and data items may also be added to the modified data collection, or reference thereto may be added. The modified data collection may also have its own set of attributes associated therewith. In this manner, content publishing system 100 efficiently obtains potentially valuable metadata about the reused data collection or data item in the modified data collection for subsequent reference. For example, a reused data item may be an image and an attribute may identify an owner of the image which may be subsequently recalled and referenced using the modified data collection. Otherwise, content publishing system 100 may have to locate the publication object that the reused data item was obtained from in order to access the attribute set, and if content publishing system 100 cannot locate the publication object then it may not be able to locate and access the attribute set. As a further example, an attribute may be permissions indicating whether the data item may be reused (i.e. reproduced) and conditions for reuse. For example, the data item may only be reused if the owner is identified in a caption. Accordingly, for the modified data collection, content publishing system 100 requires access to the set of attributes included therein to comply with the permissions conditions. As a further example, an attribute may define a style treatment for text, such as a quote, which may indicate that the text be indented and that an author for the quote be included along with the text and the value (i.e. the author's name) to include as the author.

In accordance with some embodiments, when a data collection or data item is reused and added to the modifiable data collection then a copy of the data collection or data item is made and added to the modifiable data collection. The copy of the data collection or data item may be independent of the original or linked thereto. In making the copy content publishing system 100 is operable to modify the data collection and data item such that it differs from the original. In addition, content publishing system 100 is further operable to make a copy of the associated attribute set and add the copy to the modifiable data collection. The copy of the attribute set may be independent of the original or linked thereto. In some embodiments, the original data item may include a reference to a location that the attribute set is stored in memory, and a copy of the reference may be added to the copy of the data item to be added to the modifiable data collection.

In accordance with some example embodiments, when a copy of the associated attribute set is made then the copy of the attribute set may be modified, such as by changing values for one or more attributes. For example, an attribute may include an index identifying the associated data collection or data item, such as a token, tag, positional value, and so on. The index in the copy of the attribute set may change to a new a value that identifies the copy of the associated data collection, as opposed to the original data collection that the original attribute set referred to. The changed index value may still relate to or link to the original index value, such as for example by adding an affix, header, footer and so on, such that the two index values overlap to some degree. In other example embodiments, the copy of the associated attribute set is not modified.

In some example embodiments, content publishing system 100 is operable to maintain a tracking log of all sources of a given data collection or data item. For example, a source may be a publication object publishing a given data collection or data item. As another example, a source may be a data collection including a given data collection or data item. As noted herein, each publication object, data collection and data item may be identified by an index. Content publishing system 100 may detect each time a data collection or data item is published using a publication object or included within another data collection. Content publishing system 100 may update the tracking log to refer to the publication object or enclosing data collection, such as by adding an index identifying the publication object or enclosing data collection.

In some example embodiments, content publishing system 100 is operable to maintain a tracking log using the set of attributes for a data collection or data item. This enables content publishing system 100 to efficiently determine each location a given data item is published in or contained/enclosed in. This may be desirable to efficiently make updates to data items, to implement user permissions, to monitor usage of the data item, to track copies for copyright purposes, and so on. A set of attributes may include one or more source identifiers which reference publication objects or enclosing data collections for the associated data item or data collection. A source identifier value may be an index of a publication object or enclosing data collection. There may be a source identifier value for each publication object publishing and data collection enclosing the data item (or data collection) associated with the source identifier attribute. Alternatively, the source identifier value may also refer to the original publication object that originally published the data collection or data item, and the tracking log may be implemented using a tracking attribute, and so on.

In accordance with some embodiments, a data collection that includes a given data item (or data collection) may include a reference to a location in the database where the attribute set associated with the given data item is stored. When content publishing system 100 copies the given data item and adds it to a modifiable data collection then content publishing system 100 is operable to include a copy of the reference to the set of attributes in the modifiable data collection. Accordingly, in some embodiments, the same attribute set may be referenced by the original data collection and all copies thereof. Content publishing system 100 is further operable to update the set of attributes associated with the copied data item. When a copy of a data collection or data item is made and added to a modifiable data collection then the attribute set associated with the copied data item may be updated to refer to the modifiable data collection. For example, the attribute set may include a source identifier or a tracking attribute referring to each enclosing data collection. The attribute may be updated to include a value referring to the modifiable data collection, such as for example the index identifying the modifiable data collection. The attribute may also include a value referring to the publication object publishing the modifiable data collection, such as for example the index identifying the publication object publishing the modifiable data collection.

In accordance with some embodiments, when a data collection or data item is reused and added to the modifiable data collection then a reference is added to the modifiable data collection, where the reference identifies a location of the reused data collection or data item in a database. In such embodiments, a copy of the data collection or data item does not have to be made and added to the modifiable data collection and the reference may contain code to instruct a publication object how to retrieve and publish the data item. This may provide an efficient use of memory and storage capabilities if the data item to be added is large in size, such as a large video file for example. Further, this may provide an efficient update mechanism because the original publication object and the modifiable data collection will both refer to the same data item so when an update is made thereto it will automatically be reflected in the original publication object and the modifiable data collection. A reference to a location in the database of the associated attribute set may also be added to the modifiable data collection.

Referring now to FIG. 13, there is shown an exemplary interface 2000 for modifying and publishing a new data collection 2005. The content publishing system 100 may be configured to provide the interface 2000 for display on user computers.

The modifiable data collection 2005 may include data items such as a text data item 2010, image data item 2015, video data item 2020, and may also include data collection 2022 with text and an image. Other example data items and data collections include articles, blog posts, data feeds, audio, content from social media systems, and so on. The modifiable data collection 2005 may also be empty with no contents (containing no data collections and data items) or may contain a different combination of data collections and data items. The modifiable data collection 2005 may be edited and updated using interface 2000.

The interface 2000 may include a drop down box 2004 which when activated displays a listing of modifiable data collections. Each modifiable data collection in the listing (not shown) is selectable and the selected modifiable data collection will be the one identified at 1202. As shown, data collection #1 2002 is selected and identified as the modifiable data collection. The set of modifiable data collections may be associated with a specific user, may be all available modifiable data collections, most recently accessed modifiable data collections, and so on. A graphical representation of the contents of the selected and identified data collection #1 2002 is displayed below in the interface 2000 as the modifiable data collection 2005.

The interface 2000 is illustrated in FIG. 13 in an editing mode to modify, change, or update the modifiable data collection 2005. The interface 2000 includes editing tools 2025, such as font, size, color, styles, alignment, and so on. The interface 2000 further includes a publish button 2030 to trigger the creation of a new publication object or an update to an existing publication object in order to publish the modifiable data collection 2005, and updates or edits made thereto, to one or more publication targets. The interface also includes a save button 2032 to trigger storing the updates made to the modifiable data collection in the database.

In this example, the modifiable data collection 2005 forms part of a larger data collection, along with at least one other data collection 2100. For example, the larger data collection may be a live blog for an event, and the modifiable data collection 2005 may be a live article or blog entry relating to the event. The other data collection 2100 may also relate to the event, or may be associated with the modifiable data collection 2005 in another way.

In this example interface 2000, only one modifiable data collection 2005 is shown, but in other embodiments there may be multiple modifiable data collection displayed in interface 2000. For example there may be multiple columns or other graphical representations, one for each of the modifiable data collections. Accordingly, a user may edit multiple modifiable data collections simultaneously. For example, a listing of modifiable data collections may be displayed by activating the dropdown button 2004 and one or more of them may be simultaneously selected for display and editing. Each selected modifiable data collection may displayed simultaneously in the interface 2000. For example, interface 2000 may generate a column, frame, or pop up window for each selected modifiable data collection. A user may also change which modifiable data collection is being edited and displayed in interface 2000 by selecting another modifiable data collection to edit using a drop down button 2004 to activate a listing of modifiable data collection, and upon selection the interface 2000 may update to display the newly selected modifiable data collection. The drop down button 2004 configuration is an example only and other configurations may be used to display modifiable data collections that may be selected for editing.

Referring back to FIG. 12A, at 1204, content publishing system 100 provides, using the CDN 160, a listing of publication objects. Each publication object is associated with one or more publication targets. Each publication object is associated with one or more data collection(s). Each data collection may include one or more data items, and may also include other data collections. Referring back to FIG. 13, interface 2000 may include a drop down button 2035 which when activated displays a listing of publications objects 2040, such as for example, publication object #1 2045, publication object #2 2050, publication object #3 2055, publication object #4 2060. Each publication object 2045, 2050, 2055, 2060, 2065 in the listing of publications objects 2040 is selectable using interface 2000. The listing of publications objects 2040 may include all publication objects maintained by content publishing system 100, or a subset thereof. For example, the listing of publications objects 2040 may include only those publication objects that are "open" or "live". As another example, the listing of publications objects 2040 may only include those publication objects accessible (e.g. based on permissions) to a user currently using interface 2000 to update the modifiable data collection 2005. As a further example, the listing of publications objects 2040 may be configured by a user currently using interface 2000 to create the new data collection (i.e. the modifiable data collection), such as most frequently used publications object or most recently used publication objects. The listing of publication objects 2040 may also be generated in response to a search query. A drop down list is an example of a listing of publication objects and other configurations may be used, such as icons, a dialog box, text box, search results, and so on. Content publishing system 100 is further operable to check permissions (e.g. permissions attributes, rules relating to permissions) associated with the publication objects prior to including them in the listing 2040. For example, only certain publication objects may be permitted to be accessed by a user. The listing 2040 may be tailored to a particular user to include only those publication objects permitted to be accessed by the user.

Referring back to FIG. 12A, at 1206, content publishing system 100 receives a selected publication object from the listing of publication objects 2040. The selection may be received when a publication object identified in the listing of publication objects 2040 is activated in interface 2000 via a mouse click, for example. As shown in FIG. 13 content publishing system 100 may position the selected publication object in the top spot of the listing of publication objects 2040 next to the drop down button 2035, which is publication object #1 in this example. Once a publication object from the listing of publication objects 2040 is selected, then the listing of publications objects 2040 may hide until the drop down button 2035 is activated. Alternatively, the listing of publication objects 2040 may remain displayed within interface 2000. The publication object is selected in order to reuse data collections and data items associated therewith in the modifiable data collection 2005. The publication object is selected so that a user may review data collections and data items associated therewith in order to select and add one or more to the modifiable data collection 2005. Accordingly, data collections and data items associated with the selected publication object may be reused, repurposed, modified, and so on for the new data collection. As noted herein, the set of attributes associated with the data items and data collections may also be accessed by the modifiable data collection 2005.

In accordance with some embodiments, multiple publication objects may be selected from the listing 2040 simultaneously and each selected publication object may be displayed in interface 2000 simultaneously. For example, interface may generate a column, frame, pop up window, and so on, for each selected publication object. Accordingly, although only one column is shown in interface 2000 for a modifiable data collection 2005 and although only one column is shown in interface 2000 for a selected publication object 2045, there may be multiple columns (or frames, pop up windows and so on), one for each selected modifiable data collection and publication object. This may enable a user to select data items and data collections from multiple selected publication objects to be reused and repurposed in one or more selected modifiable data collections displayed in interface 2000.

At 1208, content publishing system 100 displays data collections or data items associated with the selected publication object. As shown in FIG. 13 interface 2000 displays a set 2070 of data collections 2085 and data items 2075, 2080, 2090 associated with the selected publication object. The set 2070 may include all data collections and data items used in the selected publication object, or the set 2070 may only be a subset of the data collections and data items used in the selected publication object. For example, the subset may include the most recently added data collections and data items, the most frequently accessed data collections and data items, a configured set of data collections and data items related to a particular topic or keyword, and so on. The set 2070 may include text data items 2080, image data items 2075, video data items 2090, text/image data collection 2085, audio, formatting data, embedded computing applications, data feeds and so on. Interface 2000 may provide a scroll or navigation mechanism in order to navigate through the set 2070. Data collections and data items associated with the selected publication are displayed within interface 2000 so that a user can review them and select one or more to include in the modifiable data collection 2005. Each data collection and data item may be selectable by the user for addition to the new data collection. Content publishing system 100 is further operable to check permissions (e.g. permissions attributes, rules relating to permissions) associated with the data items and data objects of the selected publication object prior to displaying them in the interface 2000 for selection and reuse. For example, only certain data items and data collections may be permitted to be reused. The permissions may be based on specific users or may apply to all users. The restrictions for reuse may be defined by permissions (e.g. permissions attributes, rules relating to permissions).

The selected publication object may be continuously updated in real-time by one user or multiple users. If a new data collection or data object is added to the selected publication object then interface 2000 is operable to update the display of the data collections or data items associated with the selected publication object to display the new updates so that they may be selected and added to the modifiable data collection 2005. For example, the selected publication object may be a live blog for an event, such as an election, and include audio, video, images and text relating the election. The modifiable data collection 2005 may relate to a particular candidate in the election or region of the election. One or more users of content publishing system 100 may be updating the live blog for the election with new audio, video, images and text in real time and interface 2000 is operable to update the set 2070 to include these updates for selection and addition to the modifiable data collection 2005. Similarly, the modifiable data collection 2005 may be continuously updated in real-time by one user or multiple users.

At 1210, content publishing system 100 receives a selected data collection or data item from the displayed data collections and data items. For example, interface 2000 may enable selection of a data collection or data item via a mouse click. As another example, interface 2000 may be used with a touchscreen display and interface 2000 may enable selection of a data collection or data item via a touch.

At 1212, content publishing system 100 adds the selected data collection or data item to the modifiable data collection 2005. For example, interface 2000 may enable addition of the selected data collection by dragging the selected data collection or data item to a position within the modifiable data collection 2005. Other data collections and data items in the modifiable data collection 2005 may change position to accommodate the newly added data collection or data item. As shown in FIG. 13, as an example, image 2075 may be selected and added to the modifiable data collection 2005 as a copy of the image 2075*a* such that the original image 2075 remains in the selected publication object. Alternatively, a reference to the image 2075 may be added to the modifiable data collection 2005. As noted above, a copy of the set of attributes associated with the image 2075 may also be added to the modifiable data collection 2005, or a reference thereto.

Accordingly, data collections and data items from the selected publication object may be efficiently reused, repurposed, modified, and so on, in the modifiable data collection 2005, while still providing access to the corresponding set of attributes and the metadata maintained thereby. For example, the selected publication object may relate to an event, such as a professional basketball game, and may include text, photos, video, audio and the like, relating to the professional basketball game. The new data collection may be a live blog about a particular player that participated in the professional basketball game. Accordingly, text, photos, audio and video relating to the player may be part of the selected publication object for the event and may be added to the new data collection about the particular player. The set of attributes such as permissions, author, owner, and so on may also be added to the modifiable data collection 2005.

In order to add the selected data item or data collection to the new data collection, content publishing system 100 is operable to copy the selected data item or data collection and add the copy of the selected data item or data collection to the new data collection. In some instances, the original selected data item or data collection and the copy of the selected data item or data collection may be linked together so that modifications made to one may be reflected in the other. In other embodiments, modifications made to one will not be reflected in the other. The copy of the selected data item or data collection may be treated as a separate or independent data item or data collection from the original data item or data collection. The copy of the selected data item and data collection may be associated with a new index and may be tracked independently for updates and modifications. The copy of the selected data item may also be identified using a new index in the set of attributes associated therewith.

The newly added data collection or data item may be positioned anywhere within the new data collection by selecting the newly added data collection or data item and dragging it to a position within the display of the new data collection. The newly added data collection or data item may also be re-positioned within the new data collection. When the newly added data collection or data item is positioned within a data collection which includes images, text, and so on then those existing images, text may be re-positioned around the newly added data collection or data item. For example, text in the new data collection may wrap around the newly added data collection or data item.

Content publishing system 100 enables edits, manipulations and modifications to the newly added data collection or data item. As shown in FIG. 13 interface 2000 may include editing tools 2025 for editing, manipulating and modifying the newly added data collection or data item. For example, the newly added data collection or data item may be resized, aligned, rotated, cropped, reformatted, and so on. A caption may be added to the newly added data collection or data item. If the newly added data collection or data item is text then it may be modified and formatted. The newly added data collection or data item may also be deleted from the new data collection.

In accordance with some embodiments, when a modification is made to the newly added data collection or data item then a corresponding modification is made to the original data collection or data item the copy was made from. In other embodiments, when a modification is made to the newly added data collection or data item then the original data collection or data item the copy was made from remains unchanged or unaffected. Further, in accordance with some embodiments, when a modification is made to the original data collection or data item that the newly added data collection or data item is copied from then a corresponding modification is made to the newly added data collection or data item. In accordance with other embodiments, when a modification is made to the original data collection or data item that the newly added data collection or data item is copied from then the newly added data collection or data item remains unchanged or unaffected. For example, the original data collection may be a slideshow of images, and as the original slideshow is updated to include new images the copy of the slideshow in the modifiable data collection may also be automatically updated. In other cases, the copy may not be updated when the original is updated. As another example, the original data collection may be generated based on a data feed from a social media platform, and as the data feed updates the original data collection then the copy may also be automatically updated.

Content publishing system 100 may enable the creation of a slide show in the modifiable data collection 2005 including newly added data collections and data items. The slide show may be a representation of text, video, images, and other data items and data collections. The representation may be graphical, voice over, and so on.

Content publishing system 100 is operable to detect that a selected data collection or data item is moved to a position on top of another data collection or data item in the modifiable data collection 2005. In response, content publishing system 100 is operable to generate a slideshow comprising the selected data collection or data item and the other data collection or data item. Further, content publishing system 100 is operable to add the slideshow to the modifiable data collection for publication. This may be repeated as additional data items or data collections are moved to the position on top of the slideshow, and content publishing system 100 is operable to add those data items to the slideshow.

For example, the new data collection may include an image and another image may be added thereto from the selected publication object. If a new image is selected and dragged on top of the existing image then content publishing system 100 may automatically create a slideshow of the two images. More images, text, video, and so on may be added to the slideshow by selecting and dragging the data items to a position on top of the slideshow. The interface 2000 is operable to update to provide an indication that a data item or data collection is at a position on top of the slide show. Again, additional media, such as video, audio, text and so on, may also be used in the slideshow.

Content publishing system may also enable new images, audio, text, and video to be created and added to the new data collection. For example, a user may enter new text to be added to the new data collection.

After the selected data collection or data item is added to the new data collection, content publishing system 100 is operable to return to 1208 and continue to display the set 2070 so that additional data collections or data items from the selected publication object may be added to the new data collection. Content publishing system 100 is further operable to return to 1204 and provide the listing of publication objects for selection, so that additional data collections or data items from other publication objects may also be added to the new data collection. For example, each time the drop down button 2035 is activated then content publishing system 100 is operable to display a listing of publication objects, so that a user can browse data collections and data items from multiple publication objects before deciding which to reuse in the new data collection. Content publishing system 100 is further operable to return to 1202 and provide the listing of modifiable data collections for selection, so that additional modifiable data collections may be modified, updated, or changed using interface 2000.

In accordance with some embodiments, each data collection and data item is associated with a set of attributes, which includes a permissions attribute indicating whether the respective data collection or data item is permitted to be added to another data collection. Content publishing system 100 may be further operable to, at 1212, prior to adding the selected data collection or data item to the modifiable data collection 2005, check the permission attribute of the selected data collection or data item to determine whether the selected data collection or data item is permitted to be added to the modifiable data collection. The permissions attribute may depend on particular modifiable data collections or may be a default permissions attribute application to all data collections. For example, the permissions attribute of the selected data item may indicate that if an owner attribute of the modifiable data collection is of a particular value then the selected data item may be added to the modifiable data collection. As another example, the permissions attribute of the selected data item may indicate that the selected data item may not be added to any other data collections. Upon determining that the selected data collection or data item is permitted to be added to the modifiable data collection, then content publishing system 100 is operable to add the selected data collection or data item to the modifiable data collection. Upon determining that the selected data collection or data item is not permitted to be added to the modifiable data collection, then the content publishing system 100 is operable to display an error message.

In accordance with some embodiments, at 1212, content publishing system 100 is operable to modify the selected data collection or data item for the modifiable data collection. For example, the selected data collection or data item may be reformatted for the modifiable data collection. As a further example, a caption indicating the original source may be added to the selected data item before it is added to the modifiable data collection 2005.

In accordance with some embodiments, content publishing system 100 is operable to provide a rules engine of rules defining whether, for each data item and data collection, the data item or data collection is permitted to be added to the modifiable data collection. At 1212, prior to adding the selected data collection or data item to the modifiable data collection, content publishing system 100 is operable to use the rules engine to determine whether the selected data collection or data item is permitted to be added to the modifiable data collection. The rules may also define whether the selected data item should be modified and how it should be modified.

As described herein, content publishing system 100 may track each data collection and data item. Each data collection and data item may be associated with one or more source identifiers or tracking attribute for tracking publication of the respective data collection or data item. Each source identifier or tracking attribute refers to a publication object publishing the respective data collection or data item, or data collection enclosing the respective data item. At 1212, upon adding the selected data item to the modifiable data collection 2005, content publishing system 100 is operable to update the attribute of the selected data collection or data item with a source identifier referring to the modifiable data collection 2005 or publication object publishing the modifiable data collection. In other example embodiments, content publishing system 100 is operable to maintain a tracking log for each data item and at 1212 content publishing system 100 is operable to update the tracking log to identify the modifiable data collection 2005.

As noted herein, at 1212, content publishing system 100 is operable to add a reference to the modifiable data collection, wherein the references identifies a location of the selected data collection or data item in the database, instead of a copy of the selected data collection or data item.

Referring to FIG. 12B, the process 1200 proceeds to 1214 and content publishing system 100 determines whether a new publication object should be created for publishing the modifiable data collection 2005, or whether an existing publication object should be updated based on updates made to the modifiable data collection 2005. As shown in FIG. 13, interface 2000 includes a publish button 2030 which may be activated in order to publish the modifiable data collection 2005 as a publication object at one or more publication targets. The new data collection may have been previously published, and a publication object for the data collection may already exist. Interface 2000 may be used to update an already published modifiable data collection 2005 by adding selected data collections and data items thereto. Alternatively, the modifiable data collection 2005 may not have been previously published and, accordingly, a publication object for the modifiable data collection 2005 may not exist. The interface 2000 may also include a save button 2032 which saves the modifiable data collection 2005, for example, for later publication, for later modification prepublication, and so on.

If it is determined at 1214 that the new data collection has not been previously published as a publication object or that a new publication object should be created for another reason, then at 1216, content publishing system 100 creates a new publication object based on the modifiable data collection 2005 and stores the new publication object in the memory.

If it is determined at 1214 that the modifiable data collection 2005 has been previously published as a publication object, or that an existing publication object is associated with the modifiable data collection 2005 for another reason, then at 1218, content publishing system 100 updates the existing publication object based on the modifiable data collection 2005. This existing publication object is used to publish the modifiable data collection 2005 at one or more publication targets. This publication object may be different from the selected publication object.

Content publishing system 100 is operable to publish the modifiable data collection 2005 as the publication object for display on each of multiple client devices. The publication object may be formatting differently for each or some of the client devices. As described herein, content publishing system 100 is operable to efficiently update the publication objects displayed on the multiple client devices to reflect changes, modifications and updates made to the modifiable data collection 2005. Content publishing system 100 is operable to receive at least one modification of the modifiable data collection, such as at 1212 when the selected data collection is added to the modifiable data collection 2005. Content publishing system 100 is operable to store the at least one modification of the modifiable data collection 2005 in the database. Content management module 220 is operable to independently, asynchronously, and periodically identify modifications in the database. For example, content management module 220 is operable to poll the database or receive a push notification in order to identify the at least one modification of the modifiable data collection. If the polling or push notification identifies at least one modification of the modifiable data collection, content management module 220 is operable to generate a modification representation identifying the modification of the modifiable data collection. The modification representation may be a data structure suitable for instructing each of the client devices to update the publication object with the modification to the modifiable data collection 2005. Content management module 220 transmits the modification representation to a server system and, which in turn distributes the modification representation to the client devices. The modification representation updates the previously published publication object independently for each of the plurality of client devices.

In accordance with some embodiments, content management module 220 periodically receives a request from a client device for an indication that a modification to one or more data items has occurred. After identifying the at least one modification, content management module 220 is operable to generating an indication comprising a unique identifier indicating when the at least one modification occurred, and in response to the request and after generating the indication, content management module 220 is operable to transmit the indication to the client device to notify the client device that the at least one modification has occurred.

At 1220, content publishing system 100 may configure one or more publication targets which are associated with the new or updated publication object. As described, a publication target may be a web page, a web site, an embeddable object such as an iFrame or Flash™ object, or the like. Each publication target can be preconfigured by an administrator and may be displayed to a user, for example, as a descriptive name, a domain, a subdomain, a URL or some portion of a URL (e.g., shortened path name or file name). Each publication target may have one or more user-selectable template objects associated therewith.

As an example, interface 2000 may display a listing of live event blogs to select as publication targets, where the publication object may become a post, entry or article for the live event blog. The publication object may be associated with multiple publication targets. Interface 2000 may also include a text field to receive a publication target.

If a publication object already existed and was updated then it may already be associated with one or more publication targets. However, at 1220, optionally additional publication targets may be associated with the publication object.

The publication target(s) may be different than the publication targets associated with the selected publication object, or may include some of the same.

Template objects may be received from template servers, which may be websites belonging to third parties associated with particular publication targets, and processed to generate a template for publishing the publication object (and the new data collection). A template may be retrieved from a template server, for example, and the new data collection published at the publication target may be formatted based on the retrieved template.

The new or updated publication object may have one or more publication targets. Accordingly, the new or updated publication object may be published to one or more locations and, if the publication targets have different templates, the publication object may be formatted differently, depending on the publication target.

The new or updated publication object may be prepared in advance in anticipation of publication at a later time. In some cases, the newly created data collection may be associated with a "live event", in which case it may be used to aggregate, in real time, content relating to a specific topic in the modifiable data collection 2005, including the newly added data collection(s) or data item(s) selected from other publication object(s). Examples of such live events include, for example, reporting news on a current event, a live question & answer session with a person of interest, and so on.

Optionally, at 1222, content publishing system 100 receives a selection of publication type for the publication object. The publication type may be set to "live", "dynamic search", or some other value as may be appropriate.

The publication time for the publication object may also be configured. The publication time may be immediate, deferred until a predetermined future time (e.g., if the data collection is in a draft or prepublication state and saved for later publication), or it may indicate that the publication object should not be published at all (e.g., if its data collection relates to system messages, private metadata, or the like).

At 1224, optionally, content publishing system 100 determines whether the publication object relates to a live event, and a start and end time of the publication may be chosen. The start time indicates when the scheduled event will begin and the live event is considered "open". Conversely, the end time indicates when the scheduled event will end and the event is considered "closed". The "open" or "closed" state of the event may be used to control other features, such as commenting, or to alter the appearance of the published data items. For example, when an event is "open", published data items may appear in reverse chronological order, such that newly-added data items appear above older data items. Correspondingly, when an event is "closed", data items may appear in chronological order, for ease of reading.

Alternatively, the start and end time of the publication object may be used to determine if the data collection relates to a live event. For example, if the current time is between the start time and the end time, the publication object may be considered "live" and the data items associated with the data collection may be published accordingly.

Alternatively, or in addition to 1226, the publication object may be manually configured by an administrative user to specify that the object is "open" or "closed". In such cases, start and end times may be optional and not configured. In some cases, the publication object may be configured to automatically become "closed", for example after a predetermined period has passed without any activity.

If the publication type is not a live event, the process may proceed directly to configuration of user commenting at 1228. If user commenting is enabled for the publication object, end users viewing the modifiable data collection 2005 (e.g., at a publication target) may be enabled to submit comments regarding the modifiable data collection 2005. In some cases, commenters may also submit content via external sources, such as e-mail, Twitter™, Facebook™ and the like. However, some templates may prevent user commenting in certain cases, even if user commenting is enabled.

User comments may be input data that is submitted by third party end users, and which may be used to create additional user-generated data items associated with the data collection. In some cases, user-generated data items originating from the user comments may simply be aggregated with other data items originating from writer devices (e.g., input devices 122) and other authorized users (e.g., those that are already registered with the dynamic publishing system). The user-generated data items may be distinguished from writer-generated data items using a distinct visual or audible presentation, such as a different color scheme or the like.

In some cases, a live query may be configured to generate user comments based on external content, such as e-mail, Twitter and the like.

In some other cases, user-generated data items may be held for approval by a writer or administrator. The writer or administrator may approve certain of the user-generated data items, which may then be published.

In some cases, writer-generated data items may be processed in the same manner as user-generated data items, and vice versa.

In cases where user-generated data items can be held for approval, there may be a delay between the submission of the held user comment and the approval and actual publication of the data item. In a chat or question & answer type live event, such delay may result in confusing and disorderly presentation of the data items to the end user.

In some cases, to maintain continuity and orderly presentation, user-generated data items may be placed in a comment collection and associated with other data items for publication substantially contemporaneously (e.g., in a desired order). In some cases, the comment collection may be modeled as a queue. Accordingly, continuity and ease of reading can be facilitated. However, in other cases, the comment collection need not be ordered by date or time.

At 1230, content publishing system 100 may configure other options associated with the new publication object. Additional options include: a description; a header image; a game id; a language setting; HTML code; event location; time zone; profanity and objectionable language filtering; spam filtering; live language translation; user or Internet Protocol (IP) address filtering; writer and/or commenter e-mail addresses (e.g., for submitting data items directly via e-mail); and Short Message Service (SMS) short codes or phone numbers (e.g., for submitting data items directly via phone).

In some cases, the modifiable data collection 2005 may comprise one or more external queries. External queries can be search terms or external sources, from which data items can be obtained. Data items may be obtainable, in some cases, only when the data collection is "open". However, in other cases, data items may also be pulled when the data collection is "closed". An external query may specify a search term for use on an external social network, such as Twitter™ or Facebook™. For example, content published on the external website twitter.com containing the desired "hashtag" and published while the data collection is "open" can be retrieved and used as a data item. The external data items may be treated as distinct from writer-generated data items and/or user-generated data items.

Similarly, external queries can be links to a specific external source. For example, an external query may identify a specific user or group on a photo sharing website. Accordingly, content uploaded to the photo sharing website while the data collection is "open" can be retrieved and used as a data item.

As described, dynamic publishing server 210 may provide a list of template objects and publication targets, which may be associated with one or more external sites or subdomains. A user configuring the new publication object may elect to associate its data collection with one or more publication targets.

In one example, a publication target may be live.example.com, which can be hosted by storage system 150. The site live.example.com may be affiliated with www.example.com, which may have a standard content presentation style. Accordingly, www.example.com may be used as a template server. In some cases, one or more template pages may be prearranged, as is described herein.

Alternatively, a subdirectory www.example.com/live may be provided for hosting publication objects generated by dynamic publishing server 210. For example, the contents of the "live" directory may be hosted by storage system 150 or CDN 160 and dynamic publishing server 210 may be configured to transmit the required content (e.g., data items associated with a data collection in the publication object) to storage system 150 or CDN 160.

Accordingly, when a search engine indexes content belonging to example.com, the content (including any publication objects) provided at live.example.com will appear as though it is published by the publisher of www.example.com, since both live.example.com and www.example.com belong to the same domain example.com. This may have advantages for content indexing and search engine optimization purposes. When the publication object is published, dynamic publishing server 210 may publish several versions, corresponding to each of the selected publication targets. Accordingly, the publication object may appear to be published in several locations, perhaps by several parties.

Optionally, at 1232, invitations to contribute input data to be used in the new data collection created at 1202 may be generated and transmitted. For example, a list of e-mail addresses may be collected and an e-mail invitation containing login information, a registration link or the like may be sent to the provided e-mail addresses. Recipients of the e-mail invitations can use the provided login information or registration link to access a user interface for submitting input data.

In some cases, predetermined users (e.g., identified by e-mail address, phone number, or other identifiers) may be preconfigured with access to contribute input data to create data items for the data collection created at 1202.

Referring now to FIG. 14 there is shown an example publication object 2200. For this example, the publication object 2200 includes two publication objects 2205, 2210. The publication object 2200 may be a live event blog, with two or more articles 2205, 2210. One publication object 2205 is associated with the modifiable data collection 2005. As shown, the modifiable data collection 2005 includes data items such as text 2010, images 2015, 2075a (including a copy of the example selected data item, image 2075a), video 2020, and a data collection 2022 including both text and images. The other publication object 2210 is associated with another data collection 2100. Accordingly, the process described in FIG. 12 may be used to create new articles or posts for live event blogs using content from other publication objects, such as live event blogs, articles, posts, and so on. The re-used content may be modified, edited and manipulated for the modifiable data collection 2005.

After the modifiable data collection 2005 is published as the new or updated publication object, it may subsequently be updated in various ways. For example, content publishing system 100 may return to 1204 and display a listing of publication objects for selection. As a further example, content publishing system 100 may return to 1208 to display the data collections and data items for selection from the previously selected publication object to receive additional selections at 1210 and additions at 1212.

Accordingly, content publishing system 100 is operable to implement a method of providing a user interface on client devices for modifying and publishing the modifiable data collection 2005. For example, content publishing system 100 is operable to display, as part of the interface 2000, a graphical representation of a modifiable data collection 2005. Content publishing system 100 is operable to display, as part of the interface 2000, a graphical representation of a listing of one or more publication objects 2040 received from the publishing server, where each publication object is associated with one or more publication targets and comprises one or more data collections and data items stored in a database. Content publishing system 100 is operable to receive, at the interface 2000, a first selected publication object 2045 from the listing of one or more publication objects 2040. In response, content publishing system 100 is operable to provide the first selected publication object to the publishing server. Content publishing system 100 is operable to update the interface 2000 to display a graphical representation of a portion of the one or more data collections and data items 2070 of the selected publication object 2045. Content publishing system 100 is operable to receive, at the interface 2000, a selected data collection or data item from the portion of the one or more data collections and data items 2070 of the first selected publication object 2045. Content publishing system 100 is operable to update the interface 2000 to display a reproduction of the selected data collection or data item as part of the graphical representation of the modifiable data collection 2005. Content publishing system 100 is operable to receiving, at the interface 2000, a command to publish the modifiable data collection (such as via publication button 2030) as a publication object. The publication object may be associated with a publication target that is different than the one or more publication targets associated with the first selected publication object. Finally, content publishing system 100 is operable to transmit the modifiable data collection with the selected data collection or data item to the publication server.

The modifiable data collection 2005 may be a live article and include real time updates by multiple client devices. The updates may include additions from other publication objects as described herein. Content publishing system 100 is operable to facilitate synchronization of live article on multiple client devices in a peer-to-peer configuration, or by involving server.

Content publishing system 100 is operable to display the modifiable data collection 2005, interface 2000, listing of publication objects 2040, and set 2070 of data collections and data items on each of the client devices. Each client device may also include a modification module that is operable to detect modifications to the modifiable data collection 2005, listing of publication objects 2040, and set 2070 initiated on the respective user computer. The modification module is further operable to determine the type of modification and create a representation of the modification for transmission to the other client devices that may also be displaying the modifiable data collection 2005, interface 2000, listing of publication objects 2040, and set 2070 of data collections and data items. A modification module at those client devices will generate a corresponding modification to the modifiable data collection 2005 residing or rendered thereon.

The modifiable data collection 2005 may include text, formatting data, image, audio, video, embedded computing applications, data feeds or a combination thereof, in an electronic format that is capable of being provided to or displayed on client devices. The modifiable data collection 2005 may be edited, manipulated, modified and so one by the multiple client devices so that multiple users can collaborate on the modifiable data collection 2005. For example, the modifiable data collection 2005 and interface 2000 may be displayed in a browser on the client devices as part of an electronic document or page, including for example document editing application documents, markup language documents such as HTML, XML, XHTML, and the like. Similarly, the publication objects and the data collections and data items associated therewith and identified in set 2070 may also be displayed on client devices and updated on client devices.

In some embodiments, before displaying the modifiable data collection 2005 (or publication objects and the data collections and data items associated therewith), content publishing system 100 is operable to verify that it is displaying the most update to date version of the modifiable data collection 2005. Content publishing system 100 may send a call out or request to all one or more client devices connected to content publishing system 100 for representations of modifications, a most up to date or recent copy of the modifiable data collection 2005, or a combination thereof. Content publishing system 100 generates the corresponding modifications before displaying the modifiable data collection 2005 to provide an up to date, live version of the modifiable data collection 2005. Content publishing system 100 is operable to do this for the modifiable data collection 2005 as well as the selected publication objects to ensure an up to date listing of data collections and data items associated therewith.

Content publishing system 100 is operable to detect at least one modification to the modifiable data collection 2005 initiated on a client device. Examples of modifications includes, adding data collections or data items such as text or an image, deleting data collections or data items, changing the formatting of data collections or data items, changing the value of data collections or data items, dragging in data collections or data items from a selected publication object, and so on. Content publishing system 100 is operable to detect the modification at the client device at which the modification was initiated or at a server. Content publishing system 100 is operable to detect a modification to the modifiable data collection 2005 without displaying the modifiable data collection 2005 such as for example, upon receiving a request to directly add data items or detecting an update to data feeds to populate the new data collection. Examples of data feeds are for the score in a sporting event, current temperature, contest results, polling data, and the like. Content publishing system 100 is operable to receive input from a client device via input devices or receive an update via data feeds, and content publishing system 100 is operable to detect that a modification has occurred. The modification may be initiated on the client device that received the input or data feed update, or the server that received the input or data feed update. Content publishing system 100 may detect that a modification has occurred after a predetermined time duration (e.g. 500 ms) has expired since the last received input. Content publishing system 100 is operable to periodically check the data after a predetermined time duration has expired to detect modifications. Content publishing system 100 is operable to store a previous version of the modifiable data collection 2005 and compare the previous version to new versions to detect modifications. For example, content publishing system 100 will detect a modification to the data if the size, length, height, and other attributes of the new version of the modifiable data collection 2005 is different than the previous version of the modifiable data collection 2005.

The modifiable data collection 2005 may be maintained in a data structure as objects. An object is a computer representation of data that is associated with attributes and the like. Content publishing system 100 assigns an index to one or more of the objects, where the index provides an address for the object within the data structure. Content publishing system 100 updates the data structure to maintain the modification as well. The modification may also be represented in the data structure as objects, and an index may also be assigned to the objects representing the modification. For example, the data may be displayed in a browser on client devices as part of a document or page and the data structure may organize data on the document or page to provide structure for the data, to define relationships between data components, and so on.

In accordance with some embodiments, the objects are organized in the data structure as a connected tree of nodes, each node in the tree corresponding to an object; wherein each node in the connected tree has zero or more parent nodes, zero or more sibling nodes, and zero or more children nodes; and wherein the connected tree comprises a root node having zero parent nodes. The objects may also be organized in other types of data structures, such as an array, a vector, a graph, a list and so on.

In accordance with some embodiments, content publishing system 100 uses the Document Object Model (DOM) to define a data structure as a connected tree of nodes. The DOM is a model that describes how all objects (or elements) in an page, like input fields, images, paragraphs, and so on, are related to the topmost structure: the document itself. The DOM provides an application-programming interface (API) for accessing, interacting with, and modifying the objects in the document. For example, content publishing system 100 is operable to use the DOM API to configure the objects and retrieve/set attributes regarding the objects.

As an illustrative example, the modifiable data collection 2005 may form part of an online news article, and content publishing system 100 is operable to enable a plurality of reporters and authors to work on the news article collaboratively and in sync via client devices where the new data collection is accessible via the Internet and the data structure is defined by the DOM.

For this illustrative example, in order for content publishing system 100 to access the new data collection in source XML documents, the source XML files are converted into an XML document object in memory by an XML parser, which results provide a set objects (a document object) defined by the DOM. The DOM provides a model of how the various objects in the set of objects are related to each other. This set of objects can be represented as a tree of nodes that contain the data and structure of the information contained in the XML document. Content publishing system 100 can access, interact with, and modify the tree of nodes using the DOM API. Each object, whatever type it may be, may be represented as a node.

Content publishing system 100 is operable to associate a user identifier with each modification to track which client device initiated the modification. The user identifier may be a hash or string of characters used to identify a client device or a user thereof. For example, content publishing system 100 may require that a user of a user computer logs in to content publishing system 100 using a user identifier in order to access the data. If a modification is initiated at a user computer associated with the user then content publishing system 100 is operable to associate data that indicates the user identifier with those modifications. Content publishing system 100 may include the user identifier in the representation. Content publishing system 100 is further operable to store a user identifier in association with modifications to maintain a record of user that initiated modifications. Further, content publishing system 100 is operable to include other attributes in the representation as part of a class name or in another part of the representation. Content publishing system 100 is operable to associate a user identifier with modifications to consider specific styles or other formatting data that apply to a user, to determine whether the user has the required data permissions to make the modification(s), to subsequently determine which user made the modification, and so on.

As noted herein, the data may be maintained in a data structure as objects, and the content publishing system 100 is operable to assign an index to one or more objects in the data structure. An index for an object provides an address in the data structure for the object so that content publishing system 100 can look up the object. An index for an object may be an identifier associated with the object or may indirectly reference the object by its parent. The index may be one or more attributes that content publishing system 100 uses to identify the object. For example, the index may comprise a unique token used to directly identify the object, such as a series of reference characters. For example, the index may be a hash value for the object.

As another example, the data structure may maintain each object in a position relative to other objects, and the index may be a positional value for the object. For example, the index may comprise a coordinate storing the position of its assigned object in relation to the other objects. In some embodiments, the index may include a coordinate that is defined by at least three other nodes in a tree. For example, the three other nodes may be a previous sibling node in the tree, a next sibling node in the tree, and a parent node in the tree. The positional value may contain a reference to at least three other nodes in the event of those three nodes are also changed by the modifications. For example, an object may be represented as a parent node, another object may be represented as a child node to the parent node, and another object may be represented as another child node to the parent node. The positional value may reference both the parent and sibling nodes. Modifications may first move the sibling nodes being to another position and then delete the parent node. The content publishing system 100 may implement these modifications in sequence and using a positional value that references more than one other node in the tree provides multiple mechanisms to identify an object in the event a parent or a sibling is modified as well to ensure the parent or siblings is properly referenced.

An index for an object may reference the position of a parent node to the object. If the content publishing system 100 determines that the object is changed by the modification then the content publishing system 100 could include the entire changed contents of the parent node in the representation.

In some embodiments, the data structure may organize the objects as an array and the indexes may be positional values in the array of objects. The index may include a token, a positional value or both the token and the positional value (such as the coordinate for example).

The index may include different kinds of values depending on the object, such as a token for one object and a positional value for another object. The index for an object may include multiple values, such as both a token and a positional value for one object. The token is a character or series of characters used to identify the object. The positional value may be defined as in relation to other nodes in the tree.

In some embodiments, content publishing system 100 is operable to locate text objects with siblings that are container objects that are not wrapped with a container object. Content publishing system 100 is further operable to modify the data to wrap the located text objects with container objects.

Content publishing system 100 is operable to determine at least one type of modification for the at least one modification. Example types include: deleting a data collection or data item from the modifiable data collection 2005, adding a data collection or data item to the modifiable data collection 2005, editing a data collection or data item of the modifiable data collection 2005, moving a data collection or data item from a first position to a second position, and changing the modifiable data collection 2005 by more than a threshold amount of data. Another example includes changing the attributes of a data collection or data item, such as for example an index that is a coordinate defined by the siblings and parent nodes of an object. This may occur if a new sibling is added.

Upon detecting that a modification occurred to the modifiable data collection 2005, content publishing system 100 is operable to update the data structure to reflect the modification. For example, if the modification includes bolding text that results in adding new objects and modifying existing objects, then content publishing system 100 is operable to update the data structure by adding new objects and modifying the existing data collections and data items.

Content publishing system 100 is operable to create a representation of the at least one modification. The representation comprises a reference to one or more indexes assigned to the one or more updated objects. The representation may also include a reference to the at least one type of modification.

The representation may be any format that instructs the other user computers how to generate a corresponding modification. The representation may be relatively small in size compared to the entire data so that transmitting only the representation of the modification will be more efficient than transmitting the entire modifiable data collection 2005 or publication object each time a modification is detected. The representation may include a reference to the type of modification, a reference or indications of what objects are modified, how the objects are modified, or a combination thereof. The representation may also include the index associated with the modification (i.e. the data item that was modified) and the index may be used to locate the data item to be updated at the client device. The representation is in any format that can be processed and parsed by the user computers. For example, the format of the representation may be JSON (JavaScript Object Notation), which is a lightweight data-interchange format. Content publishing system 100 is operable to generate different formats for the same representation, or translate the representation into different formats to be compatible with the various user computers. For example, one client device may require a representation in a different format, such as XML, then another client device may require a representation in JSON. Content publishing system 100 is operable to translate a representation in one format into another format.

The representation may not list out each individual modification and may instead provide a portion of data to add to the data structures maintaining the data on the other client devices, or to use as replacement data. For example, if content publishing system 100 determines that the modification changed multiple objects that are all children to the same parent object, the content publishing system 100 may include a copy of the parent object and all children in the representation, along with the index assigned to the parent object. The representation will instruct the other computers to replace the previous parent object with the new copy of the parent object in the representation.

Content publishing system 100 is operable to transmit the representation. Content publishing system 100 is operable to transmit the representation to other user computers that are connected to content publishing system 100 and listening for modifications to the modifiable data collection 2005 (or selected publication object, for example). Content publishing system 100 may transmit the representation to all other client devices except for the client device at which the modification was detected, or may transmit to a portion thereof. Content publishing system 100 may also transmit the representation to a server which may in turn transmit the representation to other client devices that are connected to content publishing system 100 and listening for modifications to the modifiable data collection 2005. Server may store some or all received representations in order to maintain a central repository of all modifications or versions of the data.

Content publishing system 100 may also transmit representations to other client devices in response to a request for updates. For example, before displaying the modifiable data collection 2005, content publishing system 100 may issue a call to other client devices for an updated version. Alternatively, the other client devices may automatically send their latest version of the data to content publishing system 100 so that content publishing system 100 maintains the most recent copy of the modifiable data collection 2005. If another client device wants to join the session to collaborate on modifiable data collection 2005 then the content publishing system 100 may provide the client device with the most recent copy of the modifiable data collection 2005.

Content publishing system 100 is operable to generate a corresponding modification to the data on the other client devices using the representation, and locate the previous version of the data using the index in the representation. For example, content publishing system 100 is operable to update the display of data on the other client devices to synchronize the display of data on the client device on which the modification was detected. At the other client devices, content publishing system 100 is operable to parse and process the representation in order to generate a corresponding modification.

Content publishing system 100 is operable to generate a corresponding modification by indicating the modification on the display of the client devices by marking up the previous version of the data, highlighting the modification, animating the modification, providing a description of the modification, or otherwise indicating the modification.

In order to publish the modifiable data collection 2005 and modifications thereto as a publication object, in accordance with at least some embodiments, a current version of the modifiable data collection 2005 may be published to a server for retrieval by client devices for display thereon. The server may also publish computer-readable instructions, such as JavaScript code, for causing the client devices to periodically poll for updates to the modifiable data collection 2005 (e.g., in the form of representations of modifications to the data or another indication that modifications have been made).

Subsequently, the content publishing system 100 may periodically determine whether modifications to the modifiable data collection 2005 have been made during a predetermined interval and whether representations of the modifications have been transmitted. If modifications have been made, the content publishing system 100 is operable to transmit the representation to a server, for retrieval by the client devices. The content publishing system 100 may also transmit an indication that modifications have been made (e.g., a timestamp).

Accordingly, the client devices, while periodically polling for modifications to the modifiable data collection 2005, can determine that modifications have been made and retrieve the representation of the modifications. Based on the representation, content publishing system 100 can modify each client device's version of the content, resulting in a modified version of the content at the client device. The index in the representation enables to the client device to efficiently locate the modified data.

While this synchronization of content on multiple client devices has be described in relation to the modifiable data collection 2005, content publishing system 100 may facilitate synchronization of a selected publication object so that an up to date version of data collections and data items associated therewith is provided in interface 2000 for selection and addition to the modifiable data collection 2005. For example, the selected publication object may relate to a live blog or article that is updated by multiple client devices, and the modifications will be reflected in the set 2070 displayed in interface 2070.

It will be appreciated that various embodiments may comprise one or more special purpose or general purpose computers or servers, each of which may include, but are not limited to, one or more processors, memories, storage devices, input/output devices and network interfaces. Likewise, the terms 'computer' and 'server' may be interchangeable in accordance with the above description. Although embodiments have been described as separate components, it will be understood that various components and modules could be combined into a single module, computer or server, or implemented across multiple modules, computers or servers all connected via a communications medium such as the Internet. Likewise, it will be understood that functionality described herein as being provided by a specific component or module may also be provided by another component or module without departing from the scope of these embodiments.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Various modifications and variations may be made to these exemplary embodiments without departing from the spirit and scope of the invention, which is limited only by the appended claims.

We claim:

1. A method of modifying and publishing a data collection, wherein the method is implemented at a publishing server connected to a network, wherein the publishing server comprises a memory and a processor, and wherein the publishing server has access through the network to a database implemented using computer hardware, the method comprising:
    identifying a modifiable data collection, wherein the modifiable data collection is stored in the database;
    providing, using the network, a listing of one or more publication objects stored in the database, wherein each publication object is associated with one or more publication targets and comprises one or more data collections and data items stored in the database;
    receiving a first selected publication object from the listing of one or more publication objects;
    displaying a portion of the one or more data collections and data items of the first selected publication object;
    receiving a selected data collection or data item from the portion of the one or more data collections and data items of the first selected publication object, wherein each data collection and data item is associated with a set of attributes, wherein the set of attributes includes a permissions attribute indicating whether a respective data collection or data item is permitted to be added to another data collection;
    checking the permission attribute of the selected data collection or data item to determine whether the selected data collection or data item is permitted to be added to the modifiable data collection; and
    upon determining that the selected data collection or data item is permitted to be added to the modifiable data collection, adding, using the content management module, the selected data collection or data item to the modifiable data collection;
    publishing, using the processor, the modifiable data collection as a publication object, wherein the publication object is associated with a publication target that is different than the one or more publication targets associated with the first selected publication object; and
    storing the publication object and the modifiable data collection in the database.

2. The method of claim 1 wherein identifying the modifiable data collection comprises creating a new data collection and storing the new data collection in the database, wherein the new data collection is the modifiable data collection.

3. The method of claim 1 wherein adding the selected data collection or data item to the modifiable data collection comprises modifying the selected data collection or data item for the modifiable data collection.

4. The method of claim 1 wherein adding the selected data collection or data item to the modifiable data collection comprises reformatting the selected data collection or data item for the modifiable data collection.

5. The method of claim 1 wherein each data collection and data item is associated with one or more source identifiers for tracking publication of the respective data collection or data item, wherein each source identifier refers to a publication object publishing the respective data collection or data item, and wherein the method further comprises:
    associating the selected data collection or data item with a source identifier referring to the publication object publishing the modifiable data collection.

6. The method of claim 1 wherein a publication object corresponds to a live event stream, wherein the live event stream is a real-time aggregate of content relating to an event, wherein the live event stream comprises data collections corresponding to live articles about the event, wherein the live articles have real-time updates.

7. The method of claim 1 wherein a publication object corresponds to a live blog, wherein the live blog comprises data collections corresponding to blog posts.

8. The method of claim 1 further comprising:
receiving a second selected publication object of the listing of one or more publication objects;
displaying a portion of the one or more data collections and data items of the second selected publication object;
receiving a selected data collection or data item from the portion of the one or more data collections and data items;
adding the selected data collection or data item to the modifiable data collection; and
updating the publication object based on the modifiable data collection.

9. The method of claim 1 wherein adding the selected data collection or data item to the modifiable data collection comprises adding a reference to the modifiable data collection, wherein the references identifies a location of the selected data collection or data item in the database.

10. The method of claim 1 further comprises:
modifying the selected data collection or data item in the database, wherein the first selected publication object reflects the modification to the selected data collection or data item, and wherein the modifiable data collection reflects the modification to the selected data collection or data item based on the reference.

11. The method of claim 1 wherein adding the selected data collection or data item to the modifiable data collection comprises: making a copy of the original selected data collection or data item and adding the copy of the selected data collection or data item to the modifiable data collection.

12. The method of claim 11 wherein the selected data collection or data item is associated with a set of attributes defining metadata for the data collection or data item, and wherein adding the selected data collection or data item to a new data collection comprises making a copy of the set of attributes and associating the copy of the set of attributes with the copy of the selected data collection or data item.

13. The method of claim 11 further comprising modifying the copy of the selected data collection or data item, wherein the original selected data collection or data item is not modified when the copy of the selected data collection or data item is modified.

14. A method of modifying and publishing a data collection, wherein the method is implemented at a publishing server connected to a network, wherein the publishing server comprises a memory and a processor, and wherein the publishing server has access through the network to a database implemented using computer hardware, the method comprising:
identifying a modifiable data collection, wherein the modifiable data collection is stored in the database;
providing, using the network, a listing of one or more publication objects stored in the database, wherein each publication object is associated with one or more publication targets and comprises one or more data collections and data items stored in the database;
receiving a first selected publication object from the listing of one or more publication objects, wherein each data collection and data item is associated with a set of attributes, wherein the set of attributes includes a permissions attribute indicating whether a respective data collection or data item is permitted to be displayed and added to another data collection;
for each data collection or data item of the portion the one or more data collections and data items:
prior to displaying the respective data collection or data item in the portion, checking the permission attribute of the respective data collection or data item to determine whether the respective data collection or data item is permitted to be displayed and added to the modifiable data collection; and
upon determining that the respective data collection or data item is permitted to be displayed and added to the modifiable data collection, displaying the respective data collection or data items as part of a portion of the one or more data collections and data items of the first selected publication object;
receiving a selected data collection or data item from the portion of the one or more data collections and data items of the first selected publication object;
adding, using a content management module, the selected data collection or data item to the modifiable data collection;
publishing, using the processor, the modifiable data collection as a publication object, wherein the publication object is associated with a publication target that is different than the one or more publication targets associated with the first selected publication object; and
storing the publication object and the modifiable data collection in the database.

15. The method of claim 14, wherein adding the selected data collection or data item to the modifiable data collection comprises at least one of modifying and reformatting the selected data collection or data item for the modifiable data collection.

16. The method of claim 14, wherein each data collection and data item is associated with one or more source identifiers for tracking publication of the respective data collection or data item, wherein each source identifier refers to a publication object publishing the respective data collection or data item, and wherein the method further comprises:
associating the selected data collection or data item with a source identifier referring to the publication object publishing the modifiable data collection.

17. The method of claim 14, wherein a publication object corresponds to a live event stream, wherein the live event stream is a real-time aggregate of content relating to an event, wherein the live event stream comprises data collections corresponding to live articles about the event, wherein the live articles have real-time updates.

18. The method of claim 14, wherein a publication object corresponds to a live blog, wherein the live blog comprises data collections corresponding to blog posts.

19. A method of modifying and publishing a data collection, wherein the method is implemented at a publishing server connected to a network, wherein the publishing server comprises a memory and a processor, and wherein the publishing server has access through the network to a database implemented using computer hardware, the method comprising:
identifying a modifiable data collection, wherein the modifiable data collection is stored in the database;
providing, using the network, a listing of one or more publication objects stored in the database, wherein each publication object is associated with one or more publication targets and comprises one or more data collections and data items stored in the database, wherein each publication object is associated with a set of attributes, wherein the set of attributes includes a permissions attribute indicating whether a respective publication object includes contents permitted to be added to another data collection;

for each publication object to be identified in the listing of one or more publication objects:

prior to identifying the respective publication object in the listing, checking the permission attribute of the respective publication object to determine whether the respective publication object includes contents permitted to be added to another data collection; and upon determining that the selected data collection or data item is permitted to be added to the modifiable data collection, identifying the publication object in the listing;

receiving a first selected publication object from the listing of one or more publication objects;

displaying a portion of the one or more data collections and data items of the first selected publication object;

receiving a selected data collection or data item from the portion of the one or more data collections and data items of the first selected publication object;

adding, using a content management module, the selected data collection or data item to the modifiable data collection;

publishing, using the processor, the modifiable data collection as a publication object, wherein the publication object is associated with a publication target that is different than the one or more publication targets associated with the first selected publication object; and storing the publication object and the modifiable data collection in the database.

20. The method of claim 19, wherein adding the selected data collection or data item to the modifiable data collection comprises at least one of modifying and reformatting the selected data collection or data item for the modifiable data collection.

21. The method of claim 19, wherein each data collection and data item is associated with one or more source identifiers for tracking publication of the respective data collection or data item, wherein each source identifier refers to a publication object publishing the respective data collection or data item, and wherein the method further comprises:

associating the selected data collection or data item with a source identifier referring to the publication object publishing the modifiable data collection.

22. The method of claim 19, wherein a publication object corresponds to a live event stream, wherein the live event stream is a real-time aggregate of content relating to an event, wherein the live event stream comprises data collections corresponding to live articles about the event, wherein the live articles have real-time updates.

23. The method of claim 19, wherein a publication object corresponds to a live blog, wherein the live blog comprises data collections corresponding to blog posts.

24. A method of modifying and publishing a data collection, wherein the method is implemented at a publishing server connected to a network, wherein the publishing server comprises a memory and a processor, and wherein the publishing server has access through the network to a database implemented using computer hardware:

identifying a modifiable data collection, wherein the modifiable data collection is stored in the database;

providing, using the network, a listing of one or more publication objects stored in the database, wherein each publication object is associated with one or more publication targets and comprises one or more data collections and data items stored in the database;

receiving a first selected publication object from the listing of one or more publication objects;

displaying a portion of the one or more data collections and data items of the first selected publication object;

receiving a selected data collection or data item from the portion of the one or more data collections and data items of the first selected publication object;

providing a rules engine of rules defining whether, for each data item and data collection, the data item or data collection is permitted to be added to the modifiable data collection;

prior to adding the selected data collection or data item to the modifiable data collection, using the rules engine to determine whether the selected data collection or data item is permitted to be added to the modifiable data collection; and upon determining that the selected data collection or data item is permitted to be added to the modifiable data collection, adding, using a content management module, the selected data collection or data item to the modifiable data collection publishing, using the processor, the modifiable data collection as a publication object, wherein the publication object is associated with a publication target that is different than the one or more publication targets associated with the first selected publication object;

storing the publication object and the modifiable data collection in the database.

25. A method of modifying and publishing a data collection, wherein the method is implemented at a publishing server connected to a network, wherein the publishing server comprises a memory and a processor, and wherein the publishing server has access through the network to a database implemented using computer hardware:

identifying a modifiable data collection, wherein the modifiable data collection is stored in the database;

providing, using the network, a listing of one or more publication objects stored in the database, wherein each publication object is associated with one or more publication targets and comprises one or more data collections and data items stored in the database;

receiving a first selected publication object from the listing of one or more publication objects;

displaying a portion of the one or more data collections and data items of the first selected publication object;

receiving a selected data collection or data item from the portion of the one or more data collections and data items of the first selected publication object;

adding, using a content management module, the selected data collection or data item to the modifiable data collection by making a copy of the original selected data collection or data item and adding the copy of the selected data collection or data item to the modifiable data collection;

publishing, using the processor, the modifiable data collection as a publication object, wherein the publication object is associated with a publication target that is different than the one or more publication targets associated with the first selected publication object;

storing the publication object and the modifiable data collection in the database;

linking the original selected data collection or data item to the copy of the selected data collection or data item;

modifying the copy of the selected data collection or data item; and modifying the original selected data collection or data item based on the modification to the copy of the selected data collection or data item using the linking.

26. A method of modifying and publishing a data collection, wherein the method is implemented at a publishing server connected to a network, wherein the publishing server comprises a memory and a processor, and wherein the publishing server has access through the network to a database implemented using computer hardware:
   identifying a modifiable data collection, wherein the modifiable data collection is stored in the database;
   providing, using the network, a listing of one or more publication objects stored in the database, wherein each publication object is associated with one or more publication targets and comprises one or more data collections and data items stored in the database;
   receiving a first selected publication object from the listing of one or more publication objects;
   displaying a portion of the one or more data collections and data items of the first selected publication object;
   receiving a selected data collection or data item from the portion of the one or more data collections and data items of the first selected publication object;
   adding, using a content management module, the selected data collection or data item to the modifiable data collection by making a copy of the original selected data collection or data item and adding the copy of the selected data collection or data item to the modifiable data collection;
   publishing, using the processor, the modifiable data collection as a publication object, wherein the publication object is associated with a publication target that is different than the one or more publication targets associated with the first selected publication object;
   storing the publication object and the modifiable data collection in the database; and
   modifying the original selected data collection or data item, wherein the copy of the selected data collection or data item is not modified when the original selected data collection or data item is modified.

27. A method of modifying and publishing a data collection, wherein the method is implemented at a publishing server connected to a network, wherein the publishing server comprises a memory and a processor, and wherein the publishing server has access through the network to a database implemented using computer hardware:
   identifying a modifiable data collection, wherein the modifiable data collection is stored in the database;
   providing, using the network, a listing of one or more publication objects stored in the database, wherein each publication object is associated with one or more publication targets and comprises one or more data collections and data items stored in the database;
   receiving a first selected publication object from the listing of one or more publication objects;
   displaying a portion of the one or more data collections and data items of the first selected publication object;
   receiving a selected data collection or data item from the portion of the one or more data collections and data items of the first selected publication object;
   adding, using a content management module, the selected data collection or data item to the modifiable data collection by making a copy of the original selected data collection or data item and adding the copy of the selected data collection or data item to the modifiable data collection;
   publishing, using the processor, the modifiable data collection as a publication object, wherein the publication object is associated with a publication target that is different than the one or more publication targets associated with the first selected publication object;
   storing the publication object and the modifiable data collection in the database;
   linking the original selected data collection or data item to the copy of the selected data collection or data item;
   modifying the original selected data collection or data item; and
   modifying the copy of the selected data collection or data item based on the modification to the original selected data collection or data item using the linking.

28. A method of modifying and publishing a data collection, wherein the method is implemented at a publishing server connected to a network, wherein the publishing server comprises a memory and a processor, and wherein the publishing server has access through the network to a database implemented using computer hardware:
   identifying a modifiable data collection, wherein the modifiable data collection is stored in the database;
   providing, using the network, a listing of one or more publication objects stored in the database, wherein each publication object is associated with one or more publication targets and comprises one or more data collections and data items stored in the database;
   receiving a first selected publication object from the listing of one or more publication objects;
   displaying a portion of the one or more data collections and data items of the first selected publication object;
   receiving a selected data collection or data item from the portion of the one or more data collections and data items of the first selected publication object;
   adding, using a content management module, the selected data collection or data item to the modifiable data collection;
   publishing, using the processor, the modifiable data collection as a publication object, wherein the publication object is associated with a publication target that is different than the one or more publication targets associated with the first selected publication object;
   storing the publication object and the modifiable data collection in the database;
   detecting that a predetermined action occurs involving the selected data collection or data item and another data collection or data item in the modifiable data collection;
   generating a slideshow comprising the selected data collection or data item and the other data collection or data item;
   adding the slideshow to the modifiable data collection; and
   updating the publication object based on the slideshow in the modifiable data collection.

29. A method of modifying and publishing a data collection, wherein the method is implemented at a publishing server connected to a network, wherein the publishing server comprises a memory and a processor, and wherein the publishing server has access through the network to a database implemented using computer hardware:
   identifying a modifiable data collection, wherein the modifiable data collection is stored in the database;
   providing, using the network, a listing of one or more publication objects stored in the database, wherein each publication object is associated with one or more publication targets and comprises one or more data collections and data items stored in the database;

receiving a first selected publication object from the listing of one or more publication objects;

displaying a portion of the one or more data collections and data items of the first selected publication object;

receiving a selected data collection or data item from the portion of the one or more data collections and data items of the first selected publication object;

adding, using a content management module, the selected data collection or data item to the modifiable data collection;

publishing, using the processor, the modifiable data collection as a publication object for display on each of a plurality of client devices, wherein the publication object is associated with a publication target that is different than the one or more publication targets associated with the first selected publication object;

storing the publication object and the modifiable data collection in the database;

receiving at least one modification of the modifiable data collection;

storing the at least one modification of the modifiable data collection in the database;

detecting the at least one modification of the modifiable data collection in the database;

if the at least one modification is detected, generating a modification representation identifying the at least one modification of the modifiable data collection, wherein the modification representation is a data structure suitable for instructing each of the plurality of client devices to update the publication object with the modification to the modifiable data collection;

transmitting the modification representation to a server system; and distributing the modification representation from the server system to the plurality of client devices, wherein the modification representation updates the previously published publication object independently for each of the plurality of client devices.

30. The method of claim 28 wherein the predetermined action comprises the selected data collection or data item moved to a position on top of the other data collection or data item in the modifiable data collection.

31. The method of claim 29 further comprising, if the at least one modification is detected, generating at least one indication that the at least one modification has occurred.

32. The method of claim 31, further comprising transmitting the at least one indication to the server system for distribution.

33. The method of claim 32, wherein the at least one indication is a file comprising a unique identifier.

34. The method of claim 33, wherein the unique identifier is a timestamp.

35. The method of claim 29, wherein the modification representation identifies only modifications that occurred within a predetermined interval window.

36. The method of claim 29, wherein the modification representation comprises data for recreating the at least one modification.

37. The method of claim 29, wherein the detecting occurs asynchronously to the generating the modification representation.

38. The method of claim 29, wherein the detecting occurs asynchronously to the transmitting the modification representation.

39. The method of claim 29 further comprising:
periodically receiving a request from a client device for an indication that a modification to one or more data items has occurred;
after detecting the at least one modification, generating an indication comprising a unique identifier indicating when the at least one modification occurred; and
in response to the request and after generating the indication, transmitting the indication to the client device to notify the client device that the at least one modification has occurred.

40. The method of claim 29 further comprising:
periodically receiving a request for a modification representation at the server system from a client device;
wherein the distributing for the respective client device occurs in response to the request and after the modification representation is transmitted to the server system.

41. The method of claim 29 wherein the publication object comprises a code object for periodically retrieving a modification representation to update the data collection.

42. A method of modifying and publishing a data collection, wherein the method is implemented at a publishing server connected to a network, wherein the publishing server comprises a memory and a processor, and wherein the publishing server has access through the network to a database implemented using computer hardware:
identifying a modifiable data collection, wherein the modifiable data collection is stored in the database;
providing, using the network, a listing of one or more publication objects stored in the database, wherein each publication object is associated with one or more publication targets and comprises one or more data collections and data items stored in the database;
receiving a first selected publication object from the listing of one or more publication objects;
displaying a portion of the one or more data collections and data items of the first selected publication object;
receiving a selected data collection or data item from the portion of the one or more data collections and data items of the first selected publication object;
adding, using a content management module, the selected data collection or data item to the modifiable data collection;
publishing, using the processor, the modifiable data collection as a publication object, wherein the publication object is associated with a publication target that is different than the one or more publication targets associated with the first selected publication object;
storing the publication object and the modifiable data collection in the database; and
associating a template with the modifiable data collection.

43. The method of claim 42, wherein adding the selected data collection or data item to the modifiable data collection comprises at least one of modifying and reformatting the selected data collection or data item for the modifiable data collection.

44. The method of claim 42, wherein each data collection and data item is associated with one or more source identifiers for tracking publication of the respective data collection or data item, wherein each source identifier refers to a publication object publishing the respective data collection or data item, and wherein the method further comprises:
associating the selected data collection or data item with a source identifier referring to the publication object publishing the modifiable data collection.

* * * * *